United States Patent
Siddiqui et al.

(10) Patent No.: US 11,669,132 B2
(45) Date of Patent: Jun. 6, 2023

(54) HINGE ASSEMBLY FOR MOBILE COMPUTING DEVICE

(71) Applicant: Microsoft Technology Licensing, LLC, Redmond, WA (US)

(72) Inventors: Kabir Siddiqui, Sammamish, WA (US); Daniel Clark Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 17/191,630

(22) Filed: Mar. 3, 2021

(65) Prior Publication Data

US 2022/0100239 A1 Mar. 31, 2022

Related U.S. Application Data

(63) Continuation-in-part of application No. 17/133,133, filed on Dec. 23, 2020.
(Continued)

(51) Int. Cl.
*G06F 1/16* (2006.01)
*E05F 1/12* (2006.01)
(Continued)

(52) U.S. Cl.
CPC .......... *G06F 1/1681* (2013.01); *G05B 15/02* (2013.01); *G06F 1/1618* (2013.01);
(Continued)

(58) Field of Classification Search
CPC combination set(s) only.
See application file for complete search history.

(56) References Cited

U.S. PATENT DOCUMENTS

| 5,666,694 A | 9/1997 | Kang et al. |
| 5,874,696 A | 2/1999 | Hayashi et al. |

(Continued)

FOREIGN PATENT DOCUMENTS

| CN | 109949707 A | 6/2019 |
| CN | 110166591 A | 8/2019 |

(Continued)

OTHER PUBLICATIONS

"Notice of Allowance Issued in U.S. Appl. No. 17/133,133", dated Oct. 4, 2022, 12 Pages.
(Continued)

*Primary Examiner* — Lisa Lea-Edmonds
(74) *Attorney, Agent, or Firm* — Alleman Hall Creasman & Tuttle LLP

(57) ABSTRACT

A hinged mobile computing device includes a first housing part with a first display and a second housing part with a second display. The first and second housing parts are coupled by a hinge assembly that includes a spring-loaded opening mechanism configured to bias with a biasing torque the first housing part and second housing part to rotate away from each other when the first and second displays are in a closed face-to-face orientation. An electro-magnetic closure system is configured to retain the first and second displays in the closed face-to-face orientation against the biasing torque of the spring-loaded opening mechanism, and release of the electro-magnetic closure system permits the first housing part to rotationally separate from the second housing part to a predetermined angular orientation due to the biasing force of the spring-loaded opening mechanism.

20 Claims, 14 Drawing Sheets

Related U.S. Application Data

(60) Provisional application No. 63/085,071, filed on Sep. 29, 2020.

(51) Int. Cl.
*G05B 15/02* (2006.01)
*E05D 3/12* (2006.01)
*E05D 11/08* (2006.01)

(52) U.S. Cl.
CPC ............ *G06F 1/1647* (2013.01); *E05D 3/122* (2013.01); *E05D 11/082* (2013.01); *E05F 1/1284* (2013.01); *E05Y 2201/218* (2013.01); *E05Y 2800/45* (2013.01); *E05Y 2900/606* (2013.01)

(56) References Cited

U.S. PATENT DOCUMENTS

| | | | |
|---|---|---|---|
| 7,512,426 B2 | 3/2009 | Maatta et al. | |
| 8,638,546 B2* | 1/2014 | Hoshino | G06F 1/1681 |
| | | | 361/679.01 |
| 8,982,542 B2 | 3/2015 | Bohn | |
| 9,342,101 B2* | 5/2016 | Hsu | G06F 1/1679 |
| 9,411,365 B1 | 8/2016 | Tanner et al. | |
| 9,625,952 B2 | 4/2017 | Holung et al. | |
| 9,857,849 B1* | 1/2018 | Siddiqui | G06F 1/1618 |
| 9,891,670 B2 | 2/2018 | Kim et al. | |
| 9,983,627 B1* | 5/2018 | Pelissier | G06F 1/1681 |
| 10,088,875 B1* | 10/2018 | Lin | E05D 7/00 |
| 10,146,268 B2 | 12/2018 | Tazbaz | |
| 10,227,808 B2* | 3/2019 | Siddiqui | E05D 3/12 |
| 10,241,548 B2* | 3/2019 | Tazbaz | G06F 1/1641 |
| 10,253,804 B2* | 4/2019 | Park | E05D 11/105 |
| 10,296,044 B2* | 5/2019 | Siddiqui | E05D 3/122 |
| 10,344,510 B2* | 7/2019 | Siddiqui | G06F 1/1618 |
| 10,429,903 B2 | 10/2019 | Hong et al. | |
| 10,488,882 B2* | 11/2019 | Määttä | G06F 1/1616 |
| 10,501,973 B2* | 12/2019 | Määttä | G06F 1/1681 |
| 10,545,541 B1* | 1/2020 | Dighde | F16M 11/06 |
| 10,564,681 B2 | 2/2020 | Siddiqui | |
| 10,614,738 B2 | 4/2020 | Aurongzeb et al. | |
| 10,641,318 B2 | 5/2020 | Siddiqui | |
| 10,642,317 B2 | 5/2020 | Trim et al. | |
| 10,754,377 B2 | 8/2020 | Siddiqui | |
| 10,761,572 B1* | 9/2020 | Siddiqui | G06F 1/1681 |
| 10,795,416 B2 | 10/2020 | Schmelzle et al. | |
| 10,905,020 B2 | 1/2021 | Jan et al. | |
| 11,028,628 B2* | 6/2021 | Määttä | E05D 1/04 |
| 11,091,944 B2* | 8/2021 | Siddiqui | G06F 1/1616 |
| 11,106,248 B2* | 8/2021 | Campbell | H04M 1/022 |
| 11,119,535 B2* | 9/2021 | Haworth | H05K 5/0226 |
| 11,137,894 B1 | 10/2021 | Chen et al. | |
| 11,188,120 B2 | 11/2021 | Myung et al. | |
| 11,194,366 B2 | 12/2021 | Cheng | |
| 11,229,133 B2 | 1/2022 | Kim | |
| 11,360,508 B2 | 6/2022 | Tzou et al. | |
| 11,366,498 B2 | 6/2022 | Shibayama et al. | |
| 11,379,015 B2* | 7/2022 | Lin | G06F 1/1677 |
| 11,543,861 B2* | 1/2023 | Park | G06F 1/1616 |
| 2010/0283270 A1 | 11/2010 | Hood, III et al. | |
| 2011/0291536 A1 | 12/2011 | Jauvtis et al. | |
| 2012/0047685 A1 | 3/2012 | Ma | |
| 2012/0120618 A1 | 5/2012 | Bohn | |
| 2014/0360296 A1 | 12/2014 | Hsu | |
| 2016/0109908 A1 | 4/2016 | Siddiqui | |
| 2018/0024596 A1* | 1/2018 | Park | F16C 11/04 |
| | | | 361/679.55 |
| 2018/0049336 A1 | 2/2018 | Manuel et al. | |
| 2018/0066465 A1* | 3/2018 | Tazbaz | E05D 11/1007 |
| 2018/0067520 A1 | 3/2018 | Maatta et al. | |
| 2018/0129459 A1 | 5/2018 | Sylvan et al. | |
| 2018/0164855 A1 | 6/2018 | Tazbaz et al. | |
| 2018/0166842 A1* | 6/2018 | Siddiqui | F16C 11/04 |
| 2018/0292860 A1* | 10/2018 | Siddiqui | H04M 1/0216 |
| 2018/0356858 A1 | 12/2018 | Siddiqui et al. | |
| 2018/0363341 A1 | 12/2018 | Siddiqui et al. | |
| 2019/0094917 A1* | 3/2019 | Schmelzle | E05F 1/1253 |
| 2019/0166703 A1 | 5/2019 | Kim et al. | |
| 2019/0220064 A1* | 7/2019 | Park | G06F 1/3287 |
| 2019/0278338 A1* | 9/2019 | Siddiqui | F16C 11/04 |
| 2019/0301215 A1* | 10/2019 | Siddiqui | E05D 3/18 |
| 2019/0332239 A1 | 10/2019 | Ligameri et al. | |
| 2019/0332343 A1 | 10/2019 | Sylvan et al. | |
| 2020/0033917 A1* | 1/2020 | Tazbaz | G06F 1/1616 |
| 2020/0117233 A1 | 4/2020 | Ou et al. | |
| 2020/0128186 A1 | 4/2020 | Lombardi et al. | |
| 2020/0236801 A1 | 7/2020 | Jan et al. | |
| 2020/0326756 A1 | 10/2020 | Siddiqui et al. | |
| 2020/0363843 A1 | 11/2020 | Cheng | |
| 2021/0124544 A1 | 4/2021 | Burns et al. | |
| 2021/0132793 A1 | 5/2021 | Burns et al. | |
| 2021/0223828 A1 | 7/2021 | Kwon et al. | |
| 2021/0278942 A1 | 9/2021 | Jung | |
| 2021/0286411 A1* | 9/2021 | Park | G06F 1/1677 |
| 2021/0293066 A1* | 9/2021 | Määttä | E05D 1/04 |
| 2021/0325937 A1 | 10/2021 | Siddiqui et al. | |
| 2021/0397226 A1 | 12/2021 | Siddiqui | |
| 2022/0035419 A1 | 2/2022 | Park et al. | |
| 2022/0100238 A1 | 3/2022 | Siddiqui et al. | |

FOREIGN PATENT DOCUMENTS

| | | |
|---|---|---|
| CN | 111131568 A | 5/2020 |
| KR | 20190077292 A | 7/2019 |
| WO | 2008100013 A1 | 8/2008 |
| WO | 2016140524 A1 | 9/2016 |
| WO | 2019134695 A1 | 7/2019 |

OTHER PUBLICATIONS

"Non Final Office Action Issued in U.S. Appl. No. 17/104,595", dated Sep. 2, 2022, 10 Pages.

Dec. 23, 2020, U.S. Appl. No. 17/133,133.

Nov. 25, 2020, U.S. Appl. No. 17/104,595.

Apr. 19, 2021, U.S. Appl. No. 17/233,882.

"International Search Report and Written Opinion Issued in PCT Application No. PCT/US2021/036076", dated Aug. 16, 2021, 14 Pages.

"International Search Report and Written Opinion Issued in PCT Application No. PCT/US2021/036078", dated Aug. 17, 2021, 14 Pages.

"International Search Report and Written Opinion Issued in PCT Application No. PCT/US21/030765", dated Jul. 26, 2021, 15 Pages.

Nov. 25, 2020, U.S. Appl. No. 17/104,595, Feb. 3, 2020, US-2022-0035419-A1.

Dec. 23, 2020, U.S. Appl. No. 17/133,133, Mar. 31, 2022, US-2022-0100238-A1.

"Notice of Allowance Issued in U.S. Appl. No. 17/104,595", dated Feb. 21, 2023, 9 Pages.

* cited by examiner

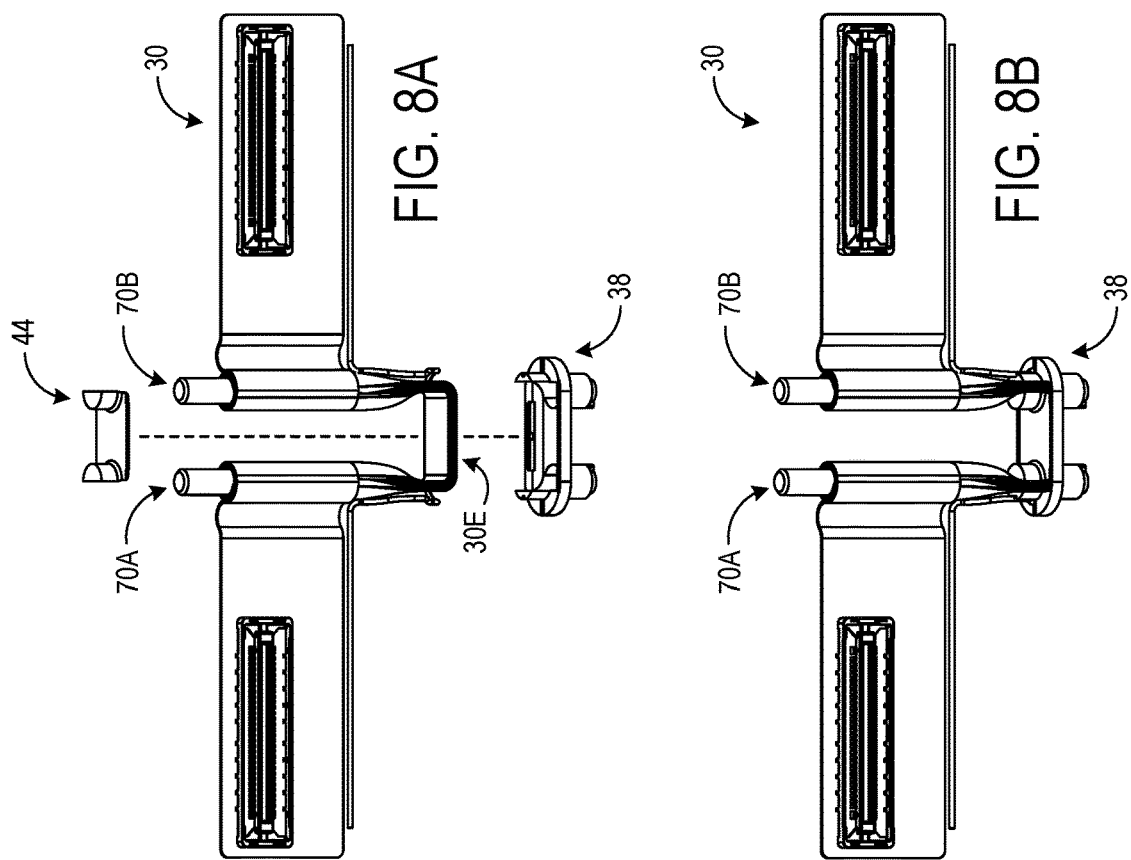
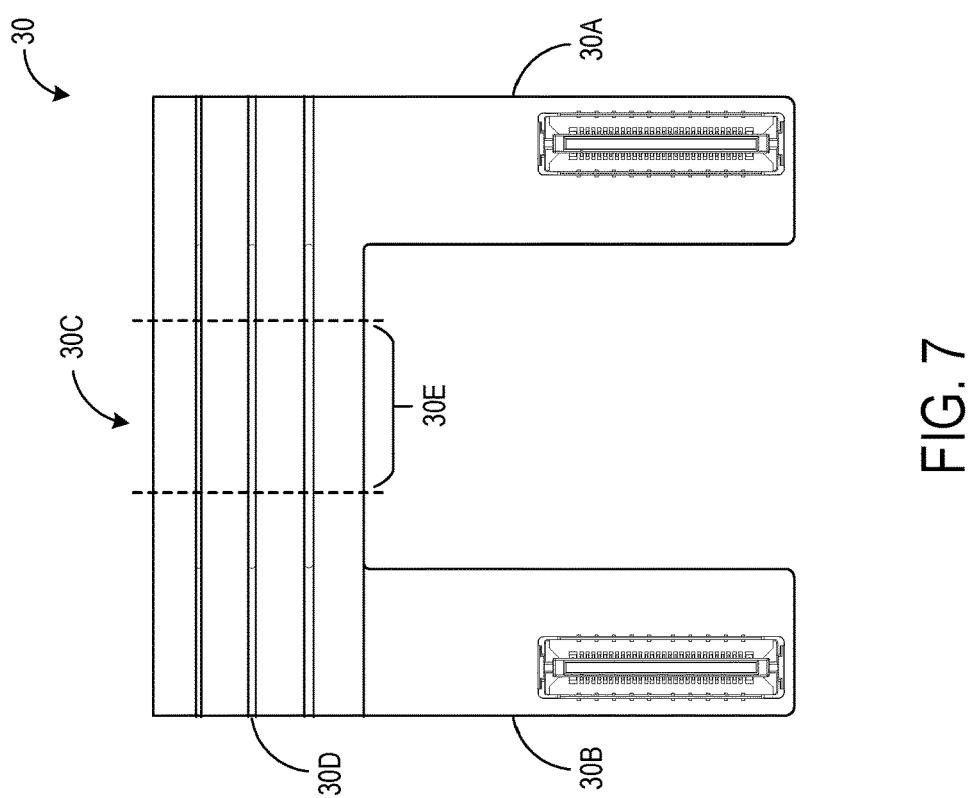

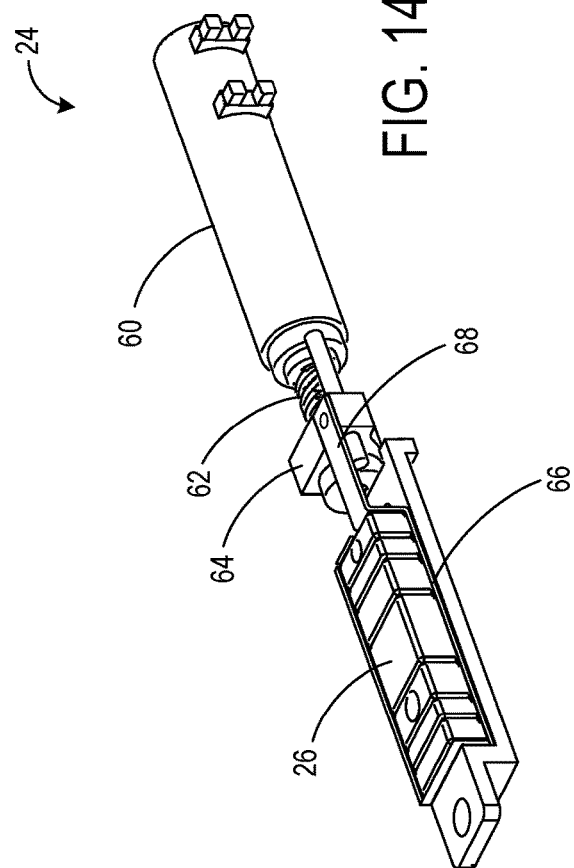
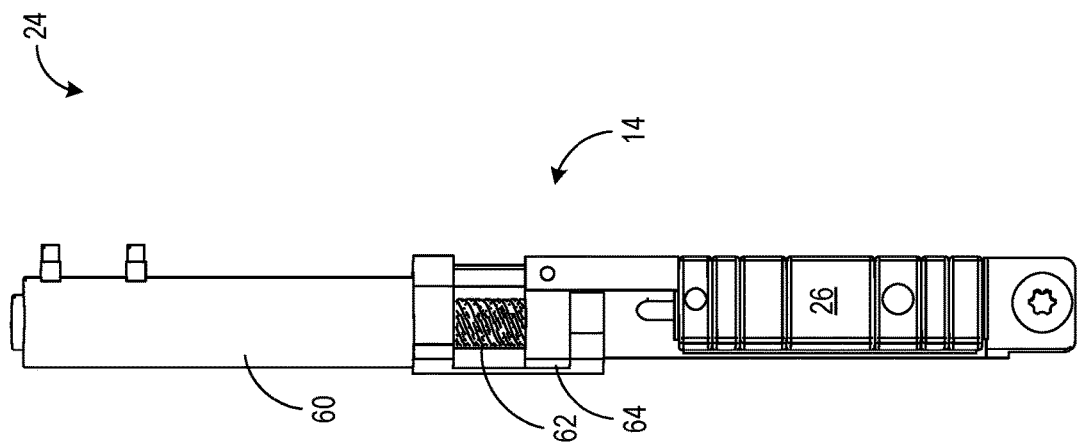

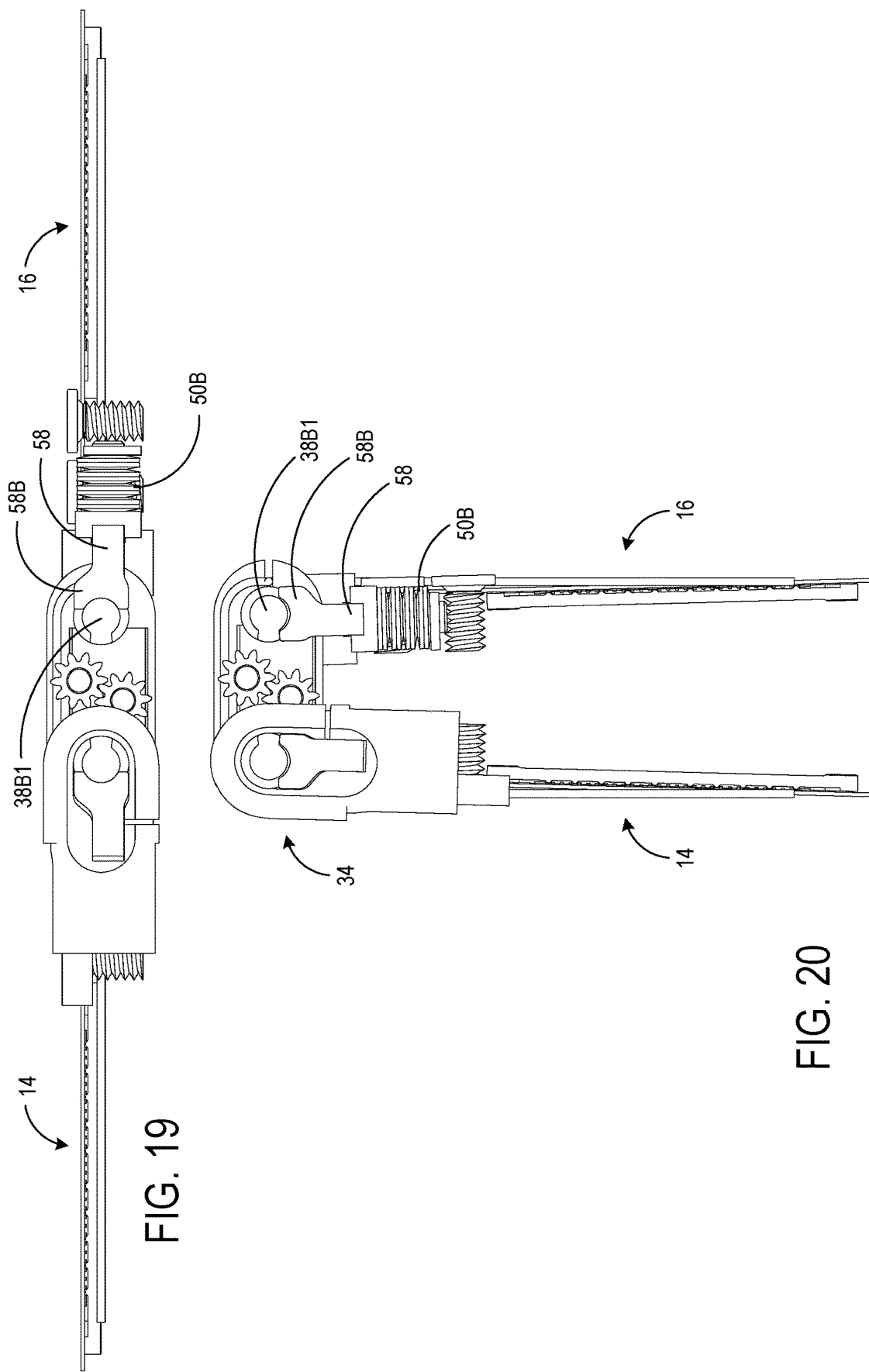

HINGE ASSEMBLY FOR MOBILE COMPUTING DEVICE

CROSS REFERENCE TO RELATED APPLICATIONS

This application claims priority to U.S. Provisional Patent Application Ser. No. 63/085,071, filed Sep. 29, 2020. This application is also a continuation-in-part to U.S. patent application Ser. No. 17/133,133, filed Dec. 23, 2020, which claims priority to U.S. Provisional Patent Application Ser. No. 63/085,071, filed Sep. 29, 2020, the entirety of each of which is hereby incorporated herein by reference for all purposes.

BACKGROUND

Hinged mobile computing devices with dual displays offer users the convenience of added screen space compared to mobile computing devices with a single display. Such devices may be used in a variety of device poses, offering users new ways of interacting with their devices. Thin bezels are often desired on mobile computing devices to increase the usable display area of the device while maintaining the same overall dimensions of the device. A device with thin bezels and hinged displays would offer even more screen space for users to enjoy, but heretofore challenges have existed to their development.

SUMMARY

To address the issues discussed herein, a mobile computing device is provided. According to one aspect, the mobile computing device may be configured as a hinged mobile computing device that includes a first housing part and a second housing part coupled by a hinge assembly. The first housing part may include a first display, the second housing part may include a second display, and the hinge assembly may be configured to permit the first and second displays to rotate from a face-to-face orientation to a back-to-back orientation. A spring-loaded opening mechanism may be arranged in the hinge assembly. The spring-loaded opening mechanism may be configured to bias with a biasing torque the first housing part and the second housing part to rotate away from each other when the first and second displays are in the closed face-to-face orientation. The mobile computing device may further include a magnetic closure system. The magnetic closure system may be configured to retain the first and second displays in the closed face-to-face orientation against the biasing torque of the spring-loaded opening mechanism. Actuation of a release actuator of the magnetic closure system when the first and second displays are in the closed face-to-face orientation may permit the first housing part to rotationally separate from the second housing part to a predetermined angular orientation due to the biasing torque of the spring-loaded opening mechanism.

According to another aspect, a method for manufacturing a mobile computing device is provided. The method may include including a first display in a first housing part and including a second display in a second housing part. The method may further include molding a hinge assembly to include a spring-loaded opening mechanism and coupling the first and second housing parts via the hinge assembly. The hinge assembly may be configured to permit rotation of the first and second displays from a closed face-to-face orientation to a back-to-back orientation, and to bias with a biasing torque the first housing part and second housing part to rotate away from each other when the first and second displays are in the closed face-to-face orientation. The method may further include including an electro-magnetic closure system in the mobile computing device. The electro-magnetic closure system may be configured to retain the first and second displays in the closed face-to-face orientation. The method may further include including a release actuator in the electro-magnetic closure system. Actuation of the release actuator when the first and second displays are in the closed face-to-face orientation may permit the first housing part to rotationally separate from the second housing part to a predetermined angular orientation due to the biasing torque of the spring-loaded opening mechanism.

According to another aspect, a method of operation of a hinged mobile device is provided. The method may include receiving a user input at a release actuator of an electro-magnetic closure system of the hinged mobile computing device when the electro-magnetic closure system is in a closed configuration. In the closed configuration, a first display and a second display may be retained in a closed face-to-face orientation against a biasing torque of a spring-loaded opening mechanism arranged in a hinge assembly of the hinged mobile computing device. In response to receiving the user input at the release actuator, the method may include actuating the electro-magnetic closure system to transition from the closed configuration to a released configuration, which permits the first housing part to rotationally separate from the second housing part. Due to a biasing torque of the spring-loaded opening mechanism, the first and second housing parts may rotationally separate from one another to a predetermined angular orientation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1-20 are scale drawings.

FIG. 2 shows a schematic view of the mobile computing device of FIG. 1 with the displays removed.

FIG. 5 shows an exploded front perspective view of a hinge assembly, cable, and flexible printed circuitry of the mobile computing device of FIG. 1.

FIG. 6 shows an exploded rear perspective view of a hinge assembly, cable, and flexible printed circuitry of the mobile computing device of FIG. 1.

FIG. 7 shows a flexible printed circuitry of the mobile computing device of FIG. 1 in a flat state.

FIGS. 8A and 8B show exploded and assembled views, respectively, of a flexible printed circuitry and a harness of the mobile computing device of FIG. 1.

FIG. 10 shows an exploded view of a flexible printed circuitry and a hinge assembly of the mobile computing device of FIG. 1.

FIG. 11 shows an enlarged assembled view of a hinge assembly of the mobile computing device of FIG. 1.

FIG. 13 shows a side view of an electro-mechanical magnetic closure system of the mobile computing device of FIG. 1.

FIG. 14 shows a perspective view of an electro-mechanical magnetic closure system of the mobile computing device of FIG. 1.

FIG. 15 shows a front view of an electro-mechanical magnetic closure system of the mobile computing device of FIG. 1 in a closed orientation.

FIG. 16 shows a front view of an electro-mechanical magnetic closure system of the mobile computing device of FIG. 1 after actuation.

FIGS. 17 to 20 show the hinge assembly of the mobile computing device of FIG. 1 in different angular orientations.

DETAILED DESCRIPTION

Figure 1:
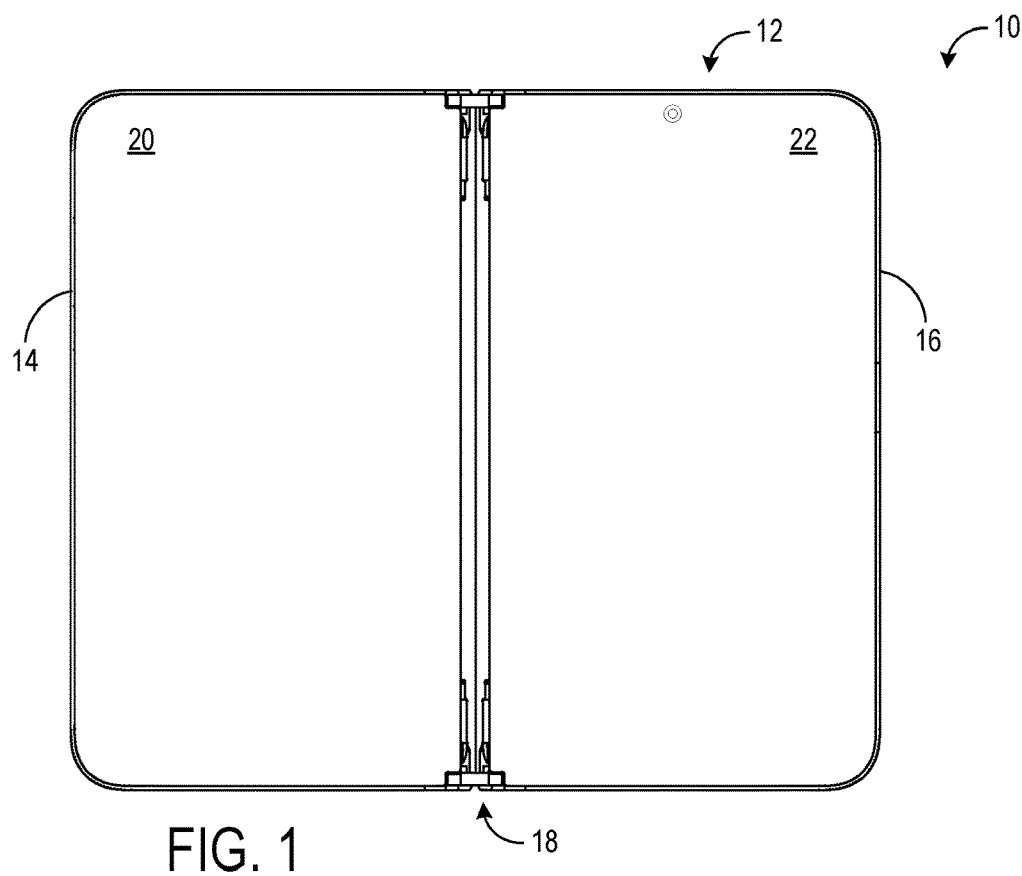
FIG. 1 shows a schematic view mobile computing device incorporating a hinge assembly according one example configuration of the present disclosure.

As schematically illustrated in FIG. 1, to address the above identified issues, a mobile computing device 10 is provided. The mobile computing device 10 may, for example, take the form of a smart phone device. In another example, the mobile computing device 10 may take other suitable forms, such as a tablet computing device, a wrist mounted computing device, or the like. The mobile computing device 10 may include a housing 12, which, for example, may take the form of a casing surrounding internal electronics and providing structure for displays, sensors, speakers, buttons, etc. The housing 12 may have a first housing part 14 and a second part housing 16 coupled by a hinge assembly 18. The first housing part 14 may include a first display 20, and the second housing part 16 may include a second display 22. The hinge assembly 18 may be configured to permit the first and second displays 20, 22 to rotate between angular orientations from a closed face-to-face angular orientation to a back-to-back angular orientation.

In one implementation, the face-to-face angular orientation is defined to have an angular displacement as measured from the first display 20 to the second display 22 of between 0 degrees and 90 degrees, an open angular orientation is defined to be between 90 degrees and 270 degrees, and the back-to-back orientation is defined to be between 270 degrees and 360 degrees. Alternatively, an implementation in which the open orientation is not used to trigger behavior may be provided, and in this implementation, the face-to-face angular orientation may be defined to be between 0 degrees and 180 degrees, and the back-to-back angular orientation may be defined to be between 180 degrees and 360 degrees. In either of these implementations, when tighter ranges are desired, the face-to-face angular orientation may be defined to be between 0 degrees and 60 degrees, or more narrowly to be between 0 degrees and 30 degrees, and the back-to-back angular orientation may be defined to be between 300 degrees and 360 degrees, or more narrowly to be between 330 degrees and 360 degrees. The 0 degree position may be referred to as fully closed in the fully face-to-face angular orientation and the 360 degree position may be referred to as fully open in the back-to-back angular orientation. In implementations that do not use a double hinge, and which are not able to rotate a full 360 degrees, fully open and/or fully closed may be greater than 0 degrees and less than 360 degrees.

Figure 2:
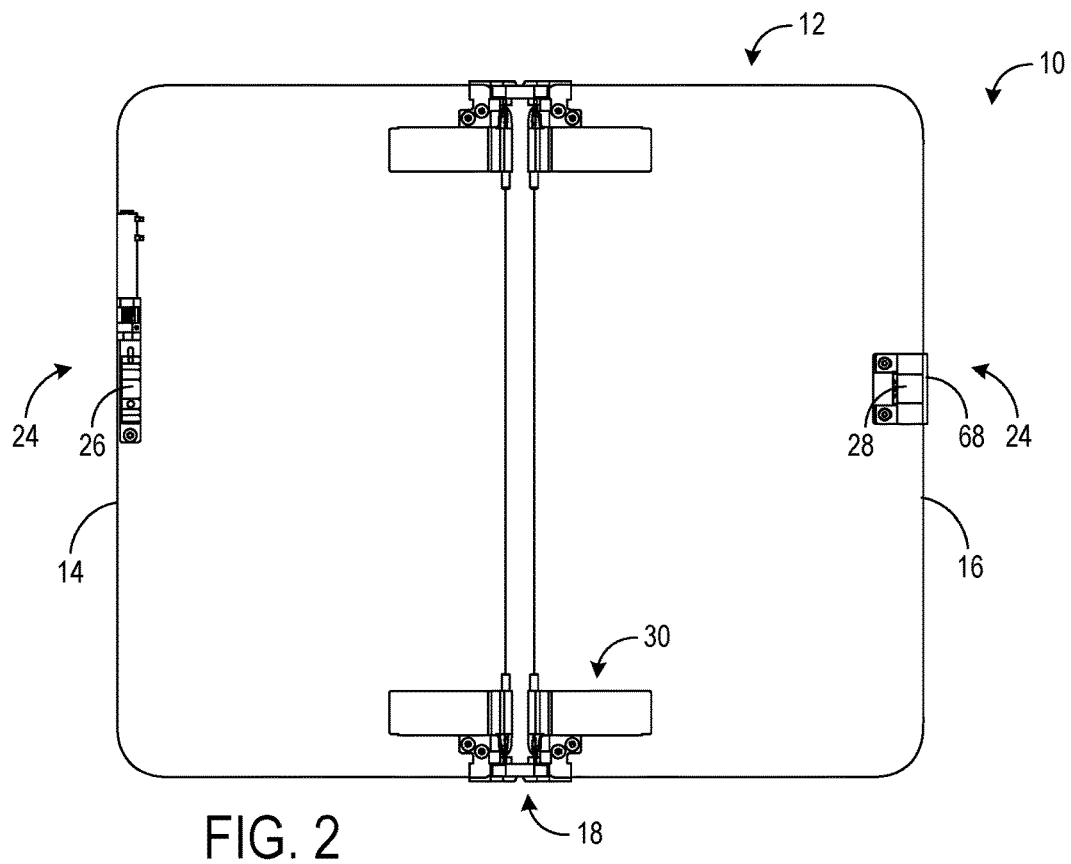

FIG. 2 shows a schematic view of the mobile computing device of FIG. 1 with the displays 20, 22 removed. The mobile computing device 10 may include flexible printed circuitry 30 arranged in the first and second housing parts 14, 16. As illustrated and described in detail below, the flexible printed circuitry 30 is routed from the first housing part 14 to the second housing part 16 via the hinge assembly 18. The utilization of the flexible printed circuitry 30 in place of conventionally used coaxial cable allows the hinge assembly 18 to have a smaller profile in the mobile computing device 10, which in turn reduces the size of the bezel and provides more available screen space on the first and second displays 20, 22.

As shown in FIG. 2 and described in detail below, the mobile computing device 10 may include a magnetic closure system configured to retain the first and second housing parts 14, 16 in the closed face-to-face orientation against a biasing torque of a spring-loaded opening mechanism. The magnetic closure system may have a first magnet 26 arranged in the first housing part 14 and a second magnet 28 arranged in the second housing part 16. When aligned, the first and second magnets 26, 28 may be configured to secure the first and second housing parts 14, 16 of the mobile computing device 10 in a closed orientation via a magnetic force. It will be appreciated that the first and second magnets 26, 28 may be configured as single magnets or as a gangs of magnets. When configured as gangs of magnets, the first and second magnets 26, 28 may be arranged as a Halbach array.

A release actuator 68 may be actuated to open the mobile computing device 10 from the closed orientation. The release actuator 68 may incorporate such features as biometric sensor and/or a power switch. In the embodiments described herein, the magnetic closure system is configured as an electro-magnetic closure system 24. However, it will be appreciated that the magnetic closure system may alternatively be configured as any suitable magnetic closure system, such as a mechanical magnetic closure system, for example.

The mobile computing device illustrated in FIGS. 1 and 2 includes two hinge assemblies; however, a single hinge assembly 18 will be described herein for the sake of clarity. When a mobile computing device is equipped with two hinge assemblies arranged at top and bottom interfaces between the first and second housing parts 14, 16, it will be appreciated that the hinge assemblies are substantially the same, but rotated at 180 degrees with respect to one another.

Figure 3A:
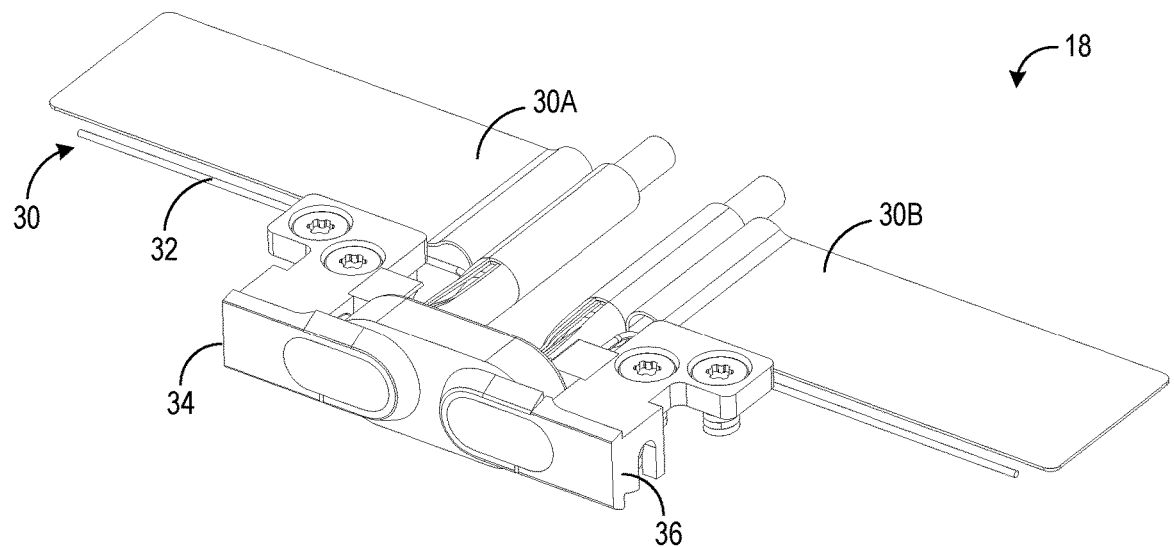
FIGS. 3A and 3B show front top and front bottom perspective views, respectively, of a hinge assembly, cable, and flexible printed circuitry of the mobile computing device of FIG. 1.
Figure 3B:
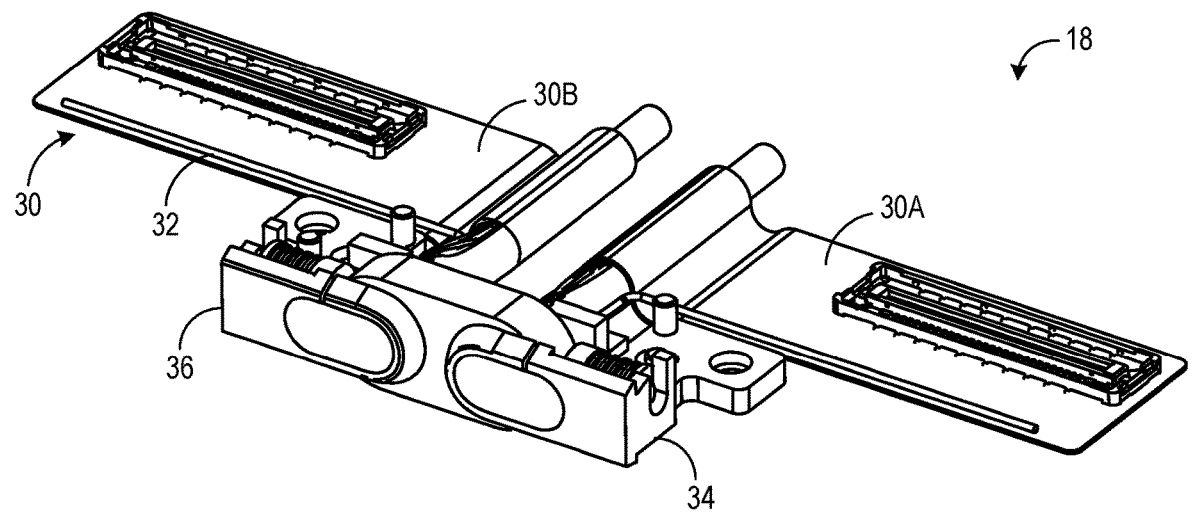
Figure 4A:
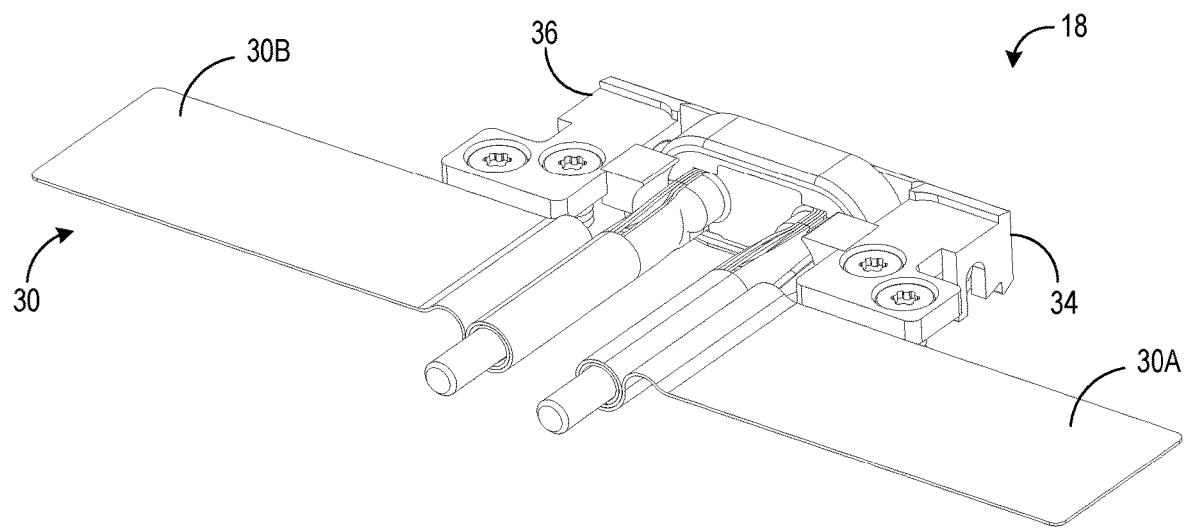
FIGS. 4A and 4B show rear top and rear bottom perspective views, respectively, of a hinge assembly, cable, and flexible printed circuitry of the mobile computing device of FIG. 1.
Figure 4B:
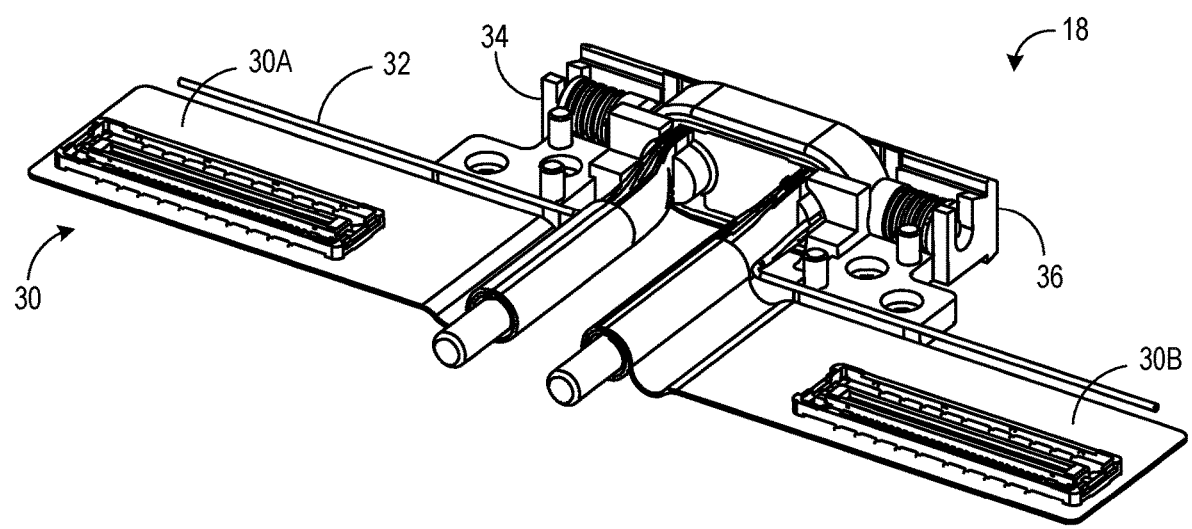

FIGS. 3A and 3B illustrate front top and front bottom perspective views, respectively, of the hinge assembly 18, and FIGS. 4A and 4B illustrate rear top and rear bottom perspective views, respectively, of the hinge assembly 18. In an assembled state, the hinge assembly 18 may be configured to route the flexible printed circuitry 30 and a flexible cable 32 from the first housing part 14 to the second housing part 16. The cable 32 is configured to connect an antenna (not shown) from one of the first and second housing parts 14, 16 to a main board arranged in the other of the first and second housing parts 14, 16. It will be appreciated that the cable may be any type of cable suitable for connecting to an antenna. In the embodiment described herein, the cable 32 is configured as a radio frequency (RF) coaxial cable 32. As described in detail below with reference to FIGS. 7, 8 and 10, the flexible printed circuitry 30 may comprise a first wing 30A and a second wing 30B joined via a folding portion 30C that is arranged in the hinge assembly 18. The hinge assembly 18 may include a first hinge body 34 configured to be arranged in the first housing part 14 and a second hinge body 36 configured to be arranged in the second housing part 16. The hinge bodies 34, 36 may be formed of a metallic material and integrally molded via an injection molding process, such as metal injection molding (MIM). Additionally or alternatively, the hinge bodies may be formed using another suitable process, such as machining, for example.

Figure 5:
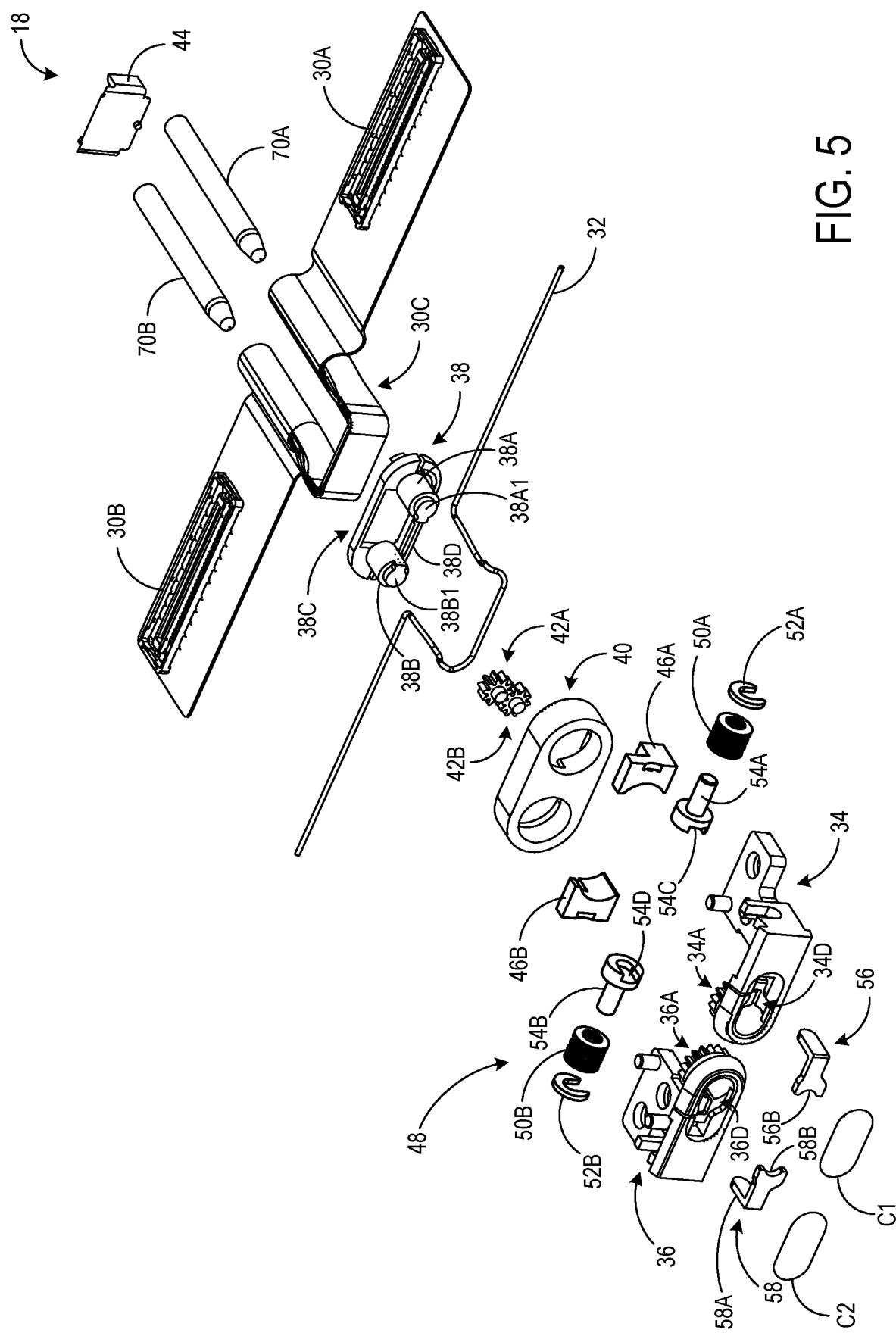
Figure 6:
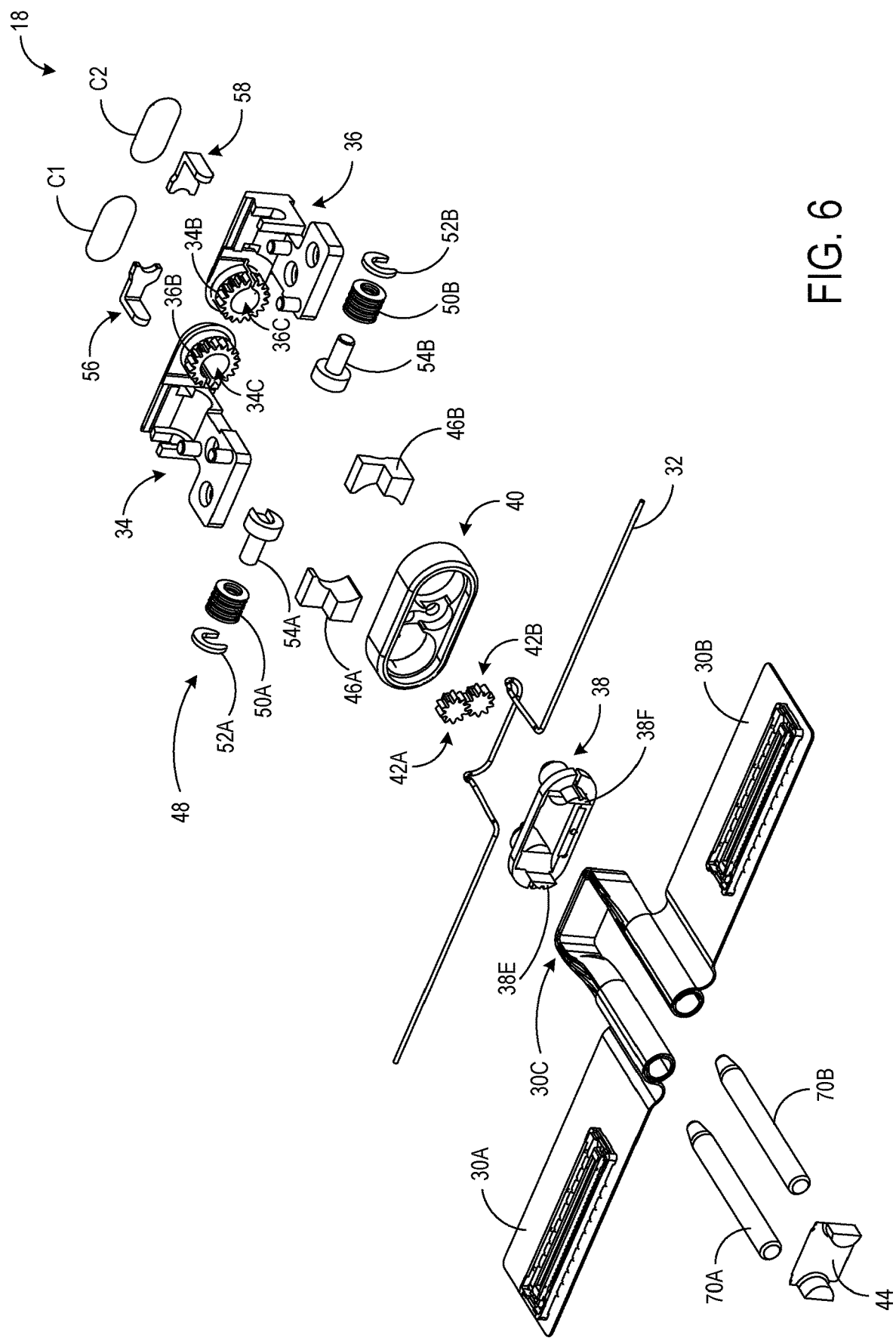

Exploded front and rear perspective views of the hinge assembly 18, flexible printed circuitry 30, and the RF coaxial cable 32 are shown in FIGS. 5 and 6, respectively. As illustrated, the first hinge body 34 may be molded to include a first friction band 34A comprising a first gear 34B formed around a first void 34C. Likewise, the second hinge body 36 may be molded to include a second friction band 36A comprising a second gear 36B formed around a second void 36C.

In addition to the first and second hinge bodies 34, 36, the hinge assembly 18 may further include a harness 38 having a first shaft 38A and a second shaft 38B, a harness cover 40, and first and second cogs 42A, 42B configured to reside within the harness cover 40. In an assembled state, the first and second shafts 38A, 38B may be received by the respective first and second friction bands 34A, 36A, and the first and second cogs 42A, 42B may mesh with the respective first and second gears 34B, 36B. Engagement of the shafts 38A, 38B with the friction bands 34A, 36A may permit rotation of the first and second hinge bodies 34, 36 around respective first and second shafts 38A, 38B, and thus permit rotation of the first and second housing parts 14, 16 between the angular orientations described above.

The friction bands 34A, 36A provide a frictional force against the respective first and second shafts 38A, 38B that prevents the first and second housing parts 14, 16 from rotating in the absence of an opening or closing force exerted by a user. However, the user may easily overcome the frictional force to move the first and second housing parts 14, 16 to a desired angular orientation. It will be appreciated that the first and second friction bands 34A, 36A are configured to be externally facing. This design allows the diameter of the friction bands 34A, 36A and shafts 38A, 38B to be larger, thereby increasing the torque and strength of the engagement of the shafts 38A, 38B with respective friction bands 34A, 36A. This configuration further facilitates a variability in the friction torque variable that enhances the behavior of a spring-loaded opening mechanism 48 included in the hinge assembly, as described below. Additionally, engagement of the gears 34B, 36B with the cogs 42A, 42B may control the rotation of the first and second hinge bodies 34, 36 and coordinate a timing of the rotation of the first and second housing parts 14, 16 between the face-to-face and back-to-back orientations.

The harness 38 may be formed to further include a first recess 38C configured to accommodate the flexible printed circuitry 30 and a second recess 38D configured to hold the RF coaxial cable 32. The hinge assembly 18 may further include a plate 44 configured to attach to the harness 38 and secure the flexible printed circuitry 30 in the harness 38. The plate 44 may be spot-welded to the harness 38. Alternatively, the plate 44 may be bonded to the harness 38 via another method, such as adhesive or glue.

In an assembled state, with reference to FIGS. 3A, 3B, 4A, and 4B, the flexible printed circuitry 30 and the RF coaxial cable 32 may extend from the first housing part 14 to the second housing part 16 via the hinge assembly 18. In the illustrated embodiment, the first and second recesses 38C, 38D are arranged on opposite sides of the harness 38. However, it will be appreciated that the first and second recesses 38C, 38D may alternately be arranged on a same side of the harness 38. As described in detail below, support rods 70A, 70B may be bonded to the flexible printed circuitry 30.

The harness 38 may further include a third shaft 38E and a fourth shaft 38F arranged opposite the first and second shafts 38A, 38B. The third and fourth shafts 38E, 38F may stabilize the flexible printed circuitry 30 when it is seated in the first recess 38C of the harness 38.

To prevent breakage of the first and/or second displays 20, 22 in the event that the mobile computing device 10 is bumped or dropped, the hinge assembly 18 may include hinge guide stoppers to prevent the hinge assembly 18 from contacting the first and/or second displays 20, 22. To this end, a first hinge guide stopper 46A may be positioned between the first hinge body 34 and the third shaft 38E of the harness, and a second hinge guide stopper 46B may be arranged between the second hinge body 36 and the fourth shaft 38F of the harness. When the mobile computing device 10 is dropped or bumped, the hinge guide stoppers 46A, 46B are configured to absorb the impact and provide a spatial cushion between hinge assembly 18 and the first and/or second displays 20, 22. The first and second hinge guide stoppers 46A, 46B may be placed after the flexible printed circuitry 30 is installed in the hinge assembly 18, and the hinge guide stoppers 46A, 46B may be secured to respective hinge bodies 34, 36 via welding. However, it will be appreciated that the first and second hinge guide stoppers 46A, 46B may be secured to respective hinge bodies 34, 36 with another method, such as a bonding adhesive, for example.

Figure 12A:
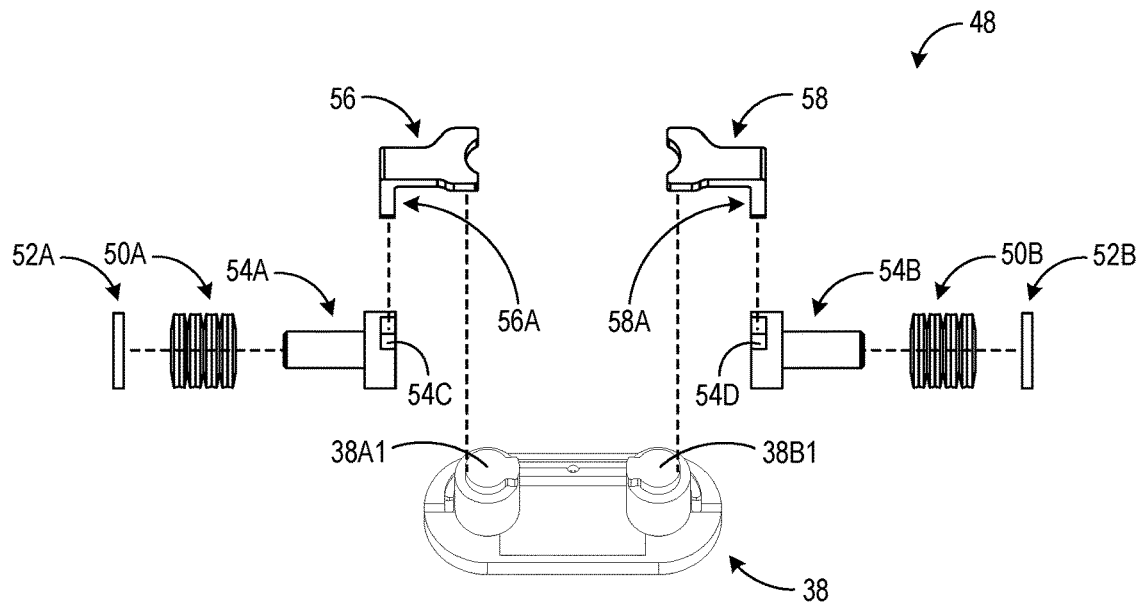
FIGS. 12A and 12B show exploded and assembled views, respectively, of a spring-loaded opening mechanism of the mobile computing device of FIG. 1.

The hinge assembly 18 may include a spring-loaded opening mechanism 48 configured to bias with a biasing torque the first housing part 14 and second housing part 16 to rotate away from each other when the first and second displays 20, 22 are in the closed face-to-face orientation. As shown in FIGS. 5 and 6, with reference to FIGS. 12A and 12B, the spring-loaded opening mechanism 48 may include a first spring 50A and a first spring seat 52A arranged on a first pin 54A and positioned in the first hinge body 34, and a second spring 50B and a second spring seat 52B arranged on a second pin 54B and positioned in the second hinge body 36.

The spring-loaded opening mechanism 48 may further include a first follower 56 and a second follower 58. Voids 34D, 36D shaped to accommodate the first and second followers 56, 58 may be respectively formed in the first and second hinge bodies 34, 36. The first and second followers may be formed such that one end of the follower is orthogonal with respect to the other end of the follower. With this configuration, a first end 56A of the first follower 56 may be disposed in a recess 54E formed in a head 54C of the first pin 54A, and a second end 56B of the first follower 56 may be engaged with a first cam 38A1 of the first shaft 38A of the harness 38. Likewise, a first end 58A of the second follower 58 may be disposed in recess 54F formed in a head 54D of the second pin 54B, and a second end 58B of the second follower 58 may be engaged with a second cam 38B1 of the first shaft 38B of the harness 38. As described below with reference to FIG. 17, the second ends 56B, 58B of the followers 56, 58 may be formed to have a concave face, and the cams 38A1, 38B1 may be formed to have a substantially arcuate surface. When the hinge assembly 18 is in an assembled state, the positioning of the followers 56, 58 in the respective voids 34D, 36D may secure engagement of each follower 56, 58 with the respective cam 38A1, 38B1. Hinge covers C1, C2 may be attached to the first and second hinge bodies 34, 36, respectively, to protect the components of the hinge assembly 18.

FIGS. 7, 8A, and 8B illustrate how the flexible printed circuitry 30 is configured to fold such that the folding portion 30C can be accommodated in the harness 38 of the hinge assembly 18. FIG. 7 shows a rear view of the flexible printed circuitry 30 in an unfolded, flat state. Prior to folding, the flat flexible printed circuitry 30 is substantially U-shaped, with the first wing 30A and the second wing 30B joined via the folding portion 30C. The folding portion 30C includes one or more pleats and/or slits 30D that may be horizontally folded to be pleated, for example, with reference to the position of the flexible printed circuitry 30 illustrated in FIG. 7. Once pleated, the folding portion 30C may be vertically folded along two axes, indicated by dashed lines in FIG. 7, to form a seating portion 30E. The U-shape of the flexible printed circuitry 30 facilitates the positioning of the first and second wings 30A, 30B in the respective housing parts 14, 16 when the folding portion 30C is pleated and folded to create the seating portion 30E that is subsequently seated in the first recess 38C of the harness 38, as shown in FIG. 8A. Further, the seating portion 30E of the flexible printed circuitry 30 that traverses the hinge assembly 18 via the harness 38 can be made to be substantially flat, thereby permitting the hinge assembly 18 to have a reduced profile such that the size of the bezel can be minimized, and the available screen space maximized.

FIGS. 8A and 8B show exploded and assembled, respectively, of the flexible printed circuitry 30 in a folded state, and engaged with the plate 44 and the harness 38. As described above, in the folded state, the folding portion 30C is pleated via the slits 30D and bent to form the seating portion 30E that is seated in the first recess 38C of the harness 38. Support rods 70A, 70B are bonded to the flexible printed circuitry at locations adjacent the wings 30A, 30B. As described above, the plate 44 may be configured to attach to the harness 38 and secure the flexible printed circuitry 30 therebetween. FIG. 8B shows the flexible printed circuitry 30 in the folded state and engaged with the harness 38 and the plate 44. In an assembled state of the mobile computing device 10, the folding portion 30C of the flexible printed circuitry 30 resides within the first recess 38C of the harness 38, the first wing 30A is bonded to the first support rod 70A and arranged in the first housing part 14, and the second wing 30B is bonded to the second support rod 70B and arranged in the second housing part 16.

Figure 9A:
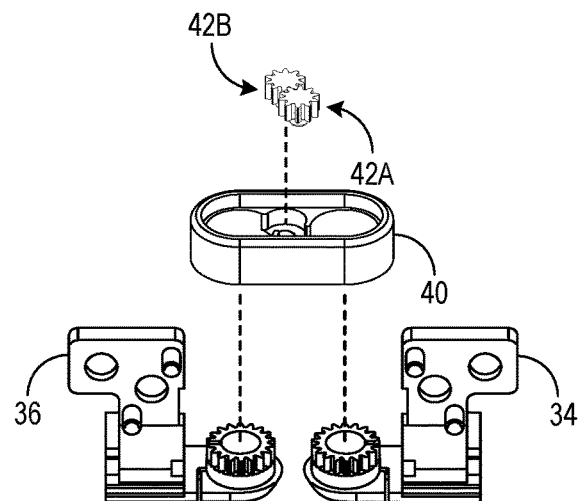
FIGS. 9A and 9B show exploded and assembled views, respectively, of hinge bodies, cogs, and a harness cover of a hinge assembly of the mobile computing device of FIG. 1.
Figure 9B:
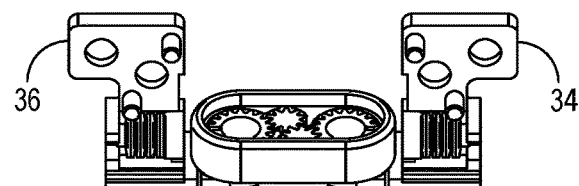

FIGS. 9A and 9B show exploded and assembled views, respectively, of the spatial relationship of the cogs 42A, 42B and the harness cover 40 with the hinge bodies 34, 36 of the hinge assembly 18. As illustrated, the harness cover 40 may be configured to receive the first and second cogs 42A, 42B and hold them in alignment to mesh with the first and second gears 34B, 36B, respectively.

Figure 10:
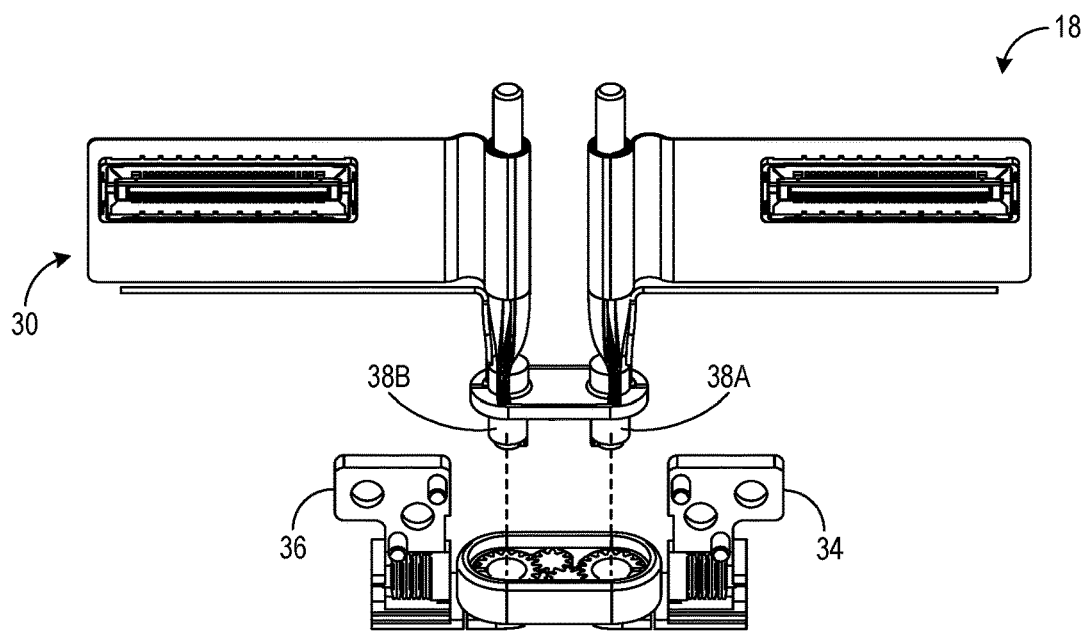

With reference to FIGS. 8B and 9B, FIG. 10 shows an exploded view of the flexible printed circuitry 30 and the hinge assembly 18 sans the harness 38. As shown, the folded flexible printed circuitry 30 may be sandwiched between the plate 44 and the harness 38. To assemble the hinge assembly 18, the first and second shafts 38A, 38B of the harness 38 may be inserted into the respective friction bands 34A, 36A that are integrally formed in the hinge bodies 34, 36, as illustrated in FIG. 10. The harness 38 may be seated in the harness cover 40, which houses the first and second gears 34B, 36B and the first and second cogs 42A, 42B. As such, each component of the hinge assembly 18 is designed to efficiently and compactly engage with other components to reduce the size of the hinge assembly 18, which reduces the size of the bezel and provides more available screen space on the first and second displays 20, 22 of the mobile computing device 10.

Figure 11:
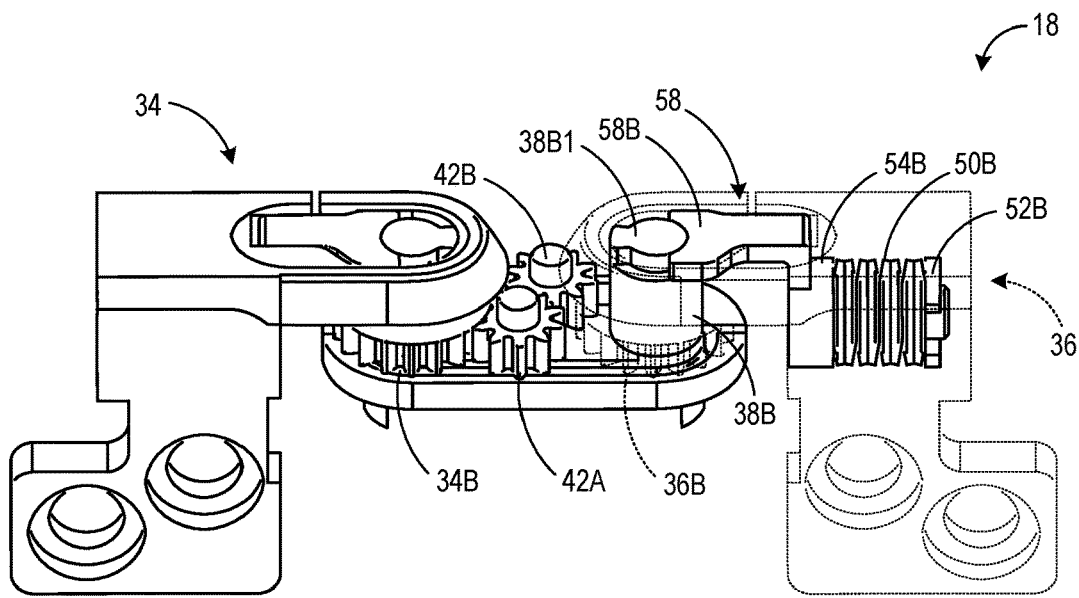

An enlarged assembled view of the hinge assembly 18 is shown in FIG. 11. It will be appreciated that the second hinge body 36 is shown in dotted line such that internal components of the hinge assembly 18 are visible. As illustrated in FIG. 11 and described above, in an assembled state, the first and second shafts 38A, 38B of the harness 38 may be configured to respectively engage the first and second hinge bodies 34, 36 via respective voids 34C, 36C formed in the respective friction bands 34A, 36A. The first and second cogs 42A, 42B may mesh with the respective first and second gears 34B, 36B. This configuration may permit rotation of the first and second hinge bodies 34, 36 around respective first and second shafts 38A, 38B, and engagement of the gears 34B, 36B with the cogs 42A, 42B may control the rotation of the first and second hinge bodies 34, 36 to coordinate the timing of the rotation of the first and second housing parts 14, 16 between the face-to-face and back-to-back orientations. Further, as described below with reference to FIGS. 12A and 12B, the first and second cams 38A1, 38B1 on the shafts 38A, 38B of the harness may be configured as components of the spring-loaded opening mechanism 48.

12A and 12B show exploded and assembled views, respectively, of the spring-loaded opening mechanism 48. As described above with reference to FIGS. 5 and 6, the first spring 50A and the first spring seat 52A may be arranged on the first pin 54A, and the second spring 50B and the second spring seat 52B may be arranged on the second pin 54B. The first end 56A of the first follower 56 may be disposed in a recess 54E formed in the head 54C of the first pin 54A. Likewise, the first end 58A of the second follower 58 may be disposed in a recess 54F formed in the head 54D of the second pin 54B.

Figure 12B:
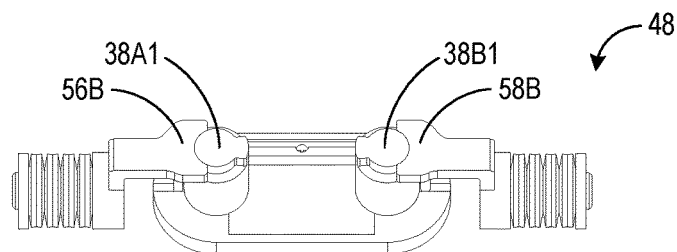

In an assembled state, as shown in FIG. 12B, the second end 56B of the first follower 56 may engage the first cam 38A1 of the first shaft 38A of the harness 38, and the second end 58B of the second follower 58 may engage the second cam 38B1 of the first shaft 38B of the harness 38. In the embodiment described herein, the first and second pins 54A, 54B are arranged orthogonally with respect to the first and second shafts 38A, 38B and parallel to an outside edge of a respective display 20, 22. In this configuration, the first and second pins 54A, 54B are horizontal when the first and second displays 20, 22 are in a side-by-side orientation, as shown in FIGS. 1 and 2. However, it will be appreciated that the first and second pins 54A, 54B may be arranged in an alternative configuration, such as along the inside edge of a respective display to be vertical when the first and second displays 20, 22 are in a side-by-side orientation.

As mentioned above and described in detail below, the mobile computing device 10 may include an electro-magnetic closure system 24 that secures the first and second housing parts 14, 16 of the mobile computing device 10 in a closed orientation via a magnetic force. It will be appreciated that the magnetic force is strong enough to overcome the biasing torque of the spring-loaded opening mechanism. When the first and second housing parts 14, 16 are magnetically secured in the closed orientation, the first and second springs 50A, 50B are held in a compressed state by the engagement of the cams 38A1, 38B1 with the respective followers 56, 58. Reduction of the magnetic force permits the first and second housing parts 14, 16 to rotationally separate due to the biasing torque of the spring-loaded opening mechanism 48. Specifically, the first and second springs are released from the compressed state, which releases the potential energy stored in the springs 50A, 50B. The potential energy released from the springs 50A, 50B is transferred to the first and second followers 56, 58 via the engagement of the first ends 56A, 56B of the first and second followers 56, 58 with the head 54C of the first pin 54A and the head 54D of the second pin 54B, respectively. This causes the second ends 56B, 58B of the first and second followers 56, 58 to rotate around the cams 38A1, 38B1, thereby rotating the first and second hinge bodies 34, 36 to separate the first housing part 14 from the second housing part 16 to the predetermined angular orientation.

FIGS. 13 and 14 are side and perspective views, respectively, of the electro-magnetic closure system 24 in a closed configuration, as it would appear in the first housing part 14 when the first and second housing parts 14, 16 are in the closed orientation. However, it will be appreciated that the electro-magnetic closure system 24 may alternatively be arranged in the second housing part 16, and the release actuator 68 may be positioned on the same or opposite housing part as the magnetic closure system 24. As shown, the electro-magnetic closure system 24 includes an electric motor 60, which is formed to have a threaded portion 62 configured to engage with a nut 64. The nut 64 is attached to a magnet housing 66 that holds one of the first or second magnets 26, 28 via a housing arm 68. In the embodiment described herein, the first magnet 26 is held in the magnet housing 66, but it will be appreciated that the magnet housing 66 may be alternatively configured to hold the second magnet 28.

Figures 15, 16:
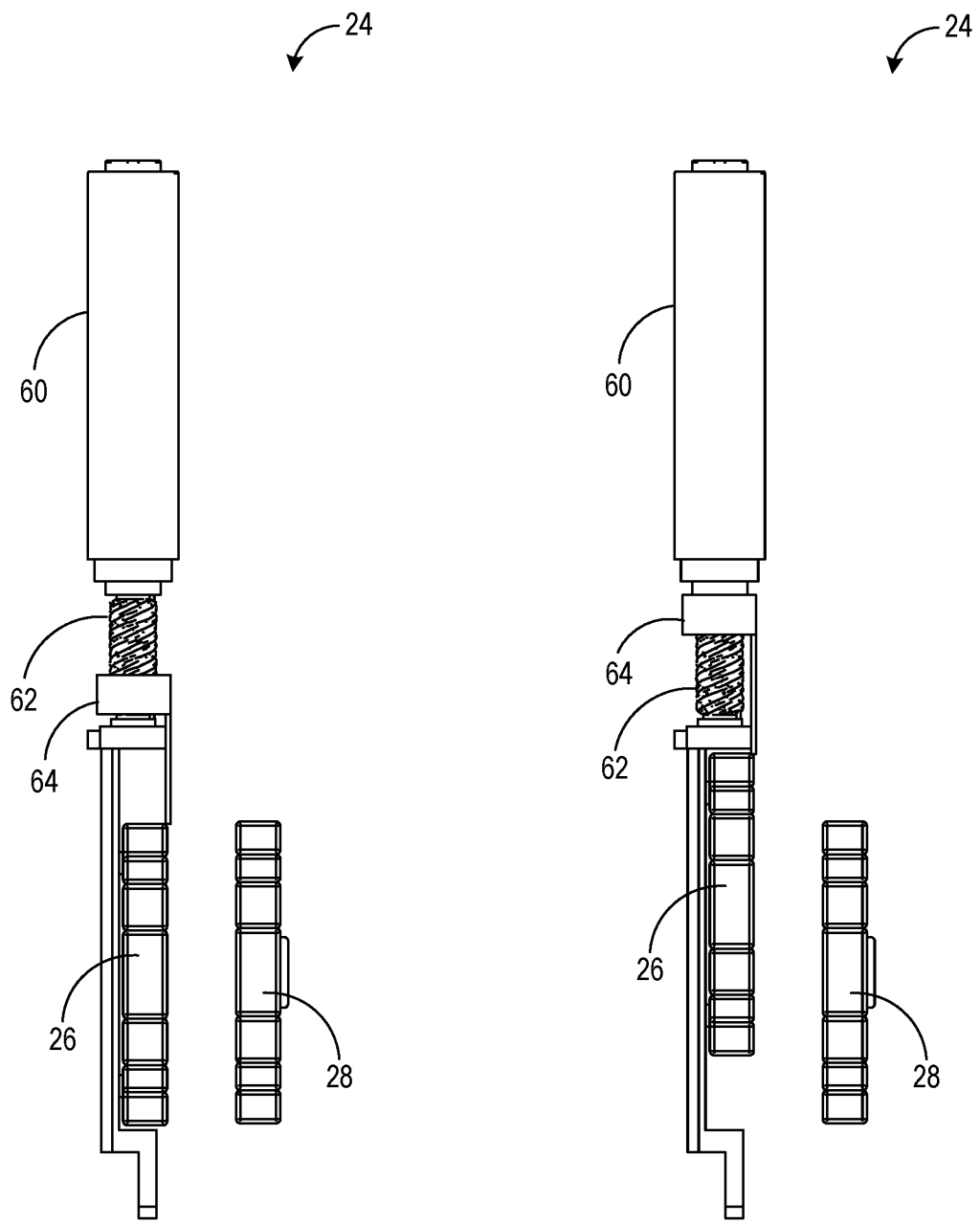

As described above, the magnetic force created by alignment of the first and second magnets 26, 28 in a closed configuration secures the first and second housing parts 14, 16 in a closed face-to-face orientation. FIG. 15 shows a front view of a spatial relationship between the first and second magnets 26, 28 as they would appear when the electro-magnetic closure system is in the closed configuration. As illustrated, the first magnet 26 is positioned proximate an electric motor 60. As discussed below, actuation of the electric motor 60 moves the first magnet 26 in a vertical direction with respect to the first housing part 14 of the mobile computing device 10. Displacement of the first magnet 26 results in a misalignment between the first and second magnets 26, 28, thereby reducing the magnetic force and releasing the spring-loaded opening mechanism 48.

FIG. 16 shows a front view of a spatial relationship between the first and second magnets 26, 28 as they would appear in the first and second housing parts 14, 16 after transitioning from the closed configuration to a released configuration upon engagement of a release actuator 68 (shown in FIG. 2). When the release actuator 68 is pressed, such as by a digit of a user, the electric motor 60 may be actuated to rotate the threaded portion 62, which causes the nut 64 to travel along the threaded portion 62 and move the first magnet 26 toward the electric motor 60, as illustrated in FIG. 16. The movement of the first magnet 26 reduces the magnetic force between the first and second magnets 26, 28 such that the magnetic closure system 24 transitions from the closed configuration to the released configuration, which may release the spring-loaded opening mechanism 48, thereby causing the first housing part 14 to rotationally separate from the second housing part 16 at a predetermined angular orientation due to the biasing torque of the spring-loaded opening mechanism. While the release actuator 68 is illustrated as being on the second housing part 16 in the embodiment shown in FIG. 1, it will be appreciated that the release actuator 68 may be arranged on either of the first or second housing parts 14, 16.

Figure 17:
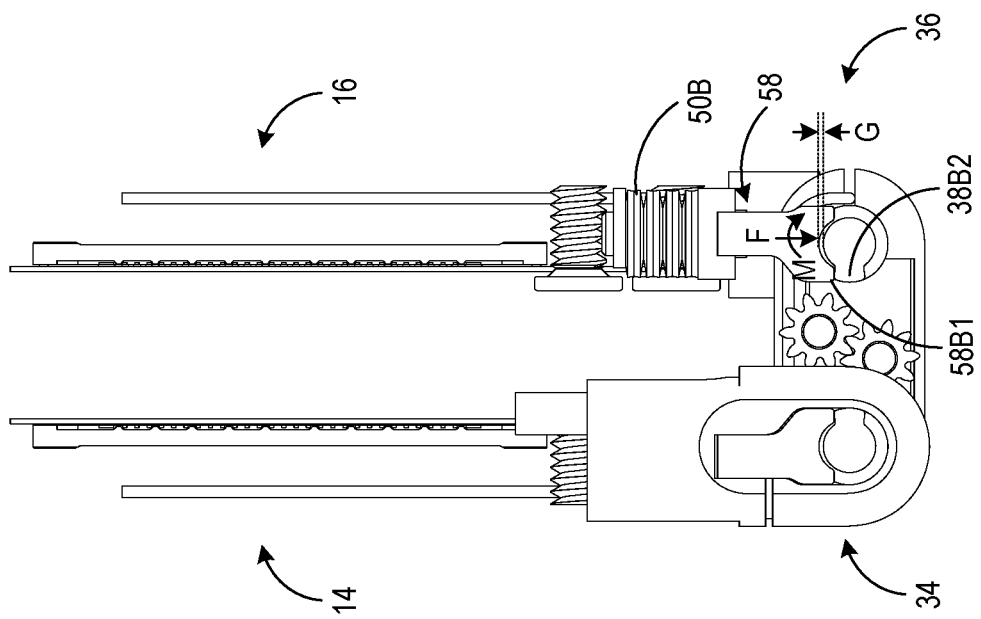

FIGS. 17 to 20 show the hinge assembly of the mobile computing device of FIG. 1 in different angular orientations. It will be appreciated that the second hinge body 36 is omitted from FIGS. 17 to 20 to illustrate the elements of the spring-loaded opening mechanism 48. In FIG. 17, the first and second housing parts 14, 16 are in the closed face-to-face angular orientation. In this orientation, the second ends 56B, 58B of the first and second followers 56, 58 are engaged with the cams 38A1, 38B1, which holds the springs 50A, 50B in the compressed state.

In FIG. 17, the engagement of the followers 56, 58 with the cams 38A1, 38B1 is illustrated with reference to the follower 58 and cam 38B1 of second hinge body 36. It will be appreciated that the engagement of the follower 56 and the cam 38A1 of the first hinge body 34 is configured likewise. As described above, the second ends 56B, 58B of the followers 56, 58 may be formed to have a concave face, and the cams 38A1, 38B1 may be formed to have a substantially arcuate surface. This configuration permits the cams 38A1, 38B1 to nest within respective second ends 56B, 58B of the followers 56, 58 when the cams 38A1, 38B1 and followers 56, 58 are fully engaged. As illustrated in FIG. 17, in the closed angular orientation, an arm 58B1 of the second follower 58 contacts a stopper 38B2 of the second cam 38B1, thereby causing a gap G between the second follower 58 and the second cam 38B1. In this configuration, the spring 50B is fully compressed and exerts a biasing force F on the second follower 58, causing the second follower 58 to experience a bending moment M, since only one side of the second follower 58 is contacting the cam 38 at stopper 38B2. This moment force supplies the biasing torque to open each display when the magnetic closure is deactivated.

As discussed above, reduction of the magnetic force by actuation of the electric motor 60 permits the first and second housing parts 14, 16 to separate due to the biasing torque of the spring-loaded opening mechanism 48, which releases the first and second springs 50A, 50B from the compressed state, thereby releasing the potential energy stored in the springs 50A, 50B. This causes the second ends 56B, 58B of the first and second followers 56, 58 to rotate around the cams 38A1, 38B1, thereby rotating the first and second hinge bodies 34, 36 to separate the first housing part 14 from the second housing part 16 at the predetermined angular orientation. Specifically, with reference to FIG. 17, when the magnetic force is relieved, the biasing force F of the spring 50B causes the second follower 58 to rotate outwardly until the concave face of the second follower 58 fully seats on the arcuate surface of the second cam 38B1, which occurs at the predetermined angular orientation, as illustrated in FIG. 18.

The opening of the first and second housing parts 14, 16 to the predetermined angular orientation upon release of the spring-loaded mechanism permits the user to insert a digit between the first and second housing parts 14, 16 to open the mobile computing device 10. Additionally or alternatively, separating the first and second housing parts 14, 16 to the predetermined angular orientation may serve as a "peek" mode that allows the user to quickly view one or both of the first and second displays 20, 22 to check notifications, messages, or the like without fully opening the mobile computing device 10. Accordingly, the predetermined angular orientation may be configured to be any angle suitable for inserting a digit and/or viewing the first and second displays 20, 22, such as an angle in a range of 10 degrees to 45 degrees.

Figure 18:
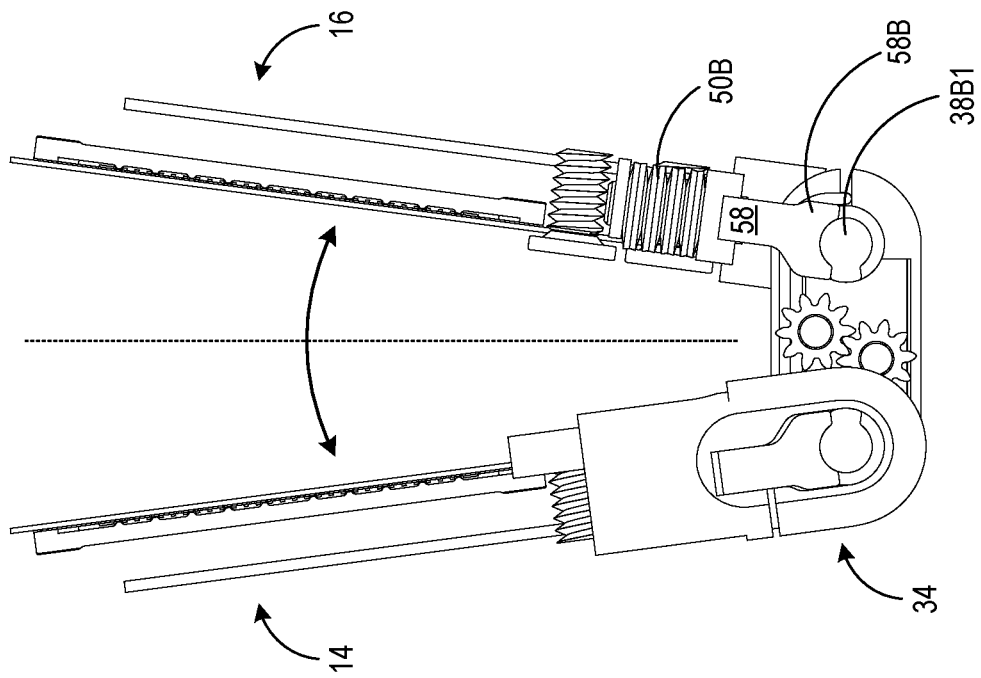

For example, in the configuration shown in FIG. 18, the first and second housing parts 14, 16 are open at an angle of 15 degrees in the predetermined angular orientation. When the first and second housing parts 14, 16 reach the predetermined angular orientation, the preloaded springs 50A, 50B cease to impart rotational motion to the first and second followers 56, 58. With this configuration, the opening of the first and second housing parts 14, 16 is coordinated such that they open to the same degree in a timed manner.

FIGS. 19 and 20 show the first and second housing parts open to side-by-side and back-to-back angular orientations, respectively. While an equal rotation of the first and second housing parts 14, 16 around the hinge assembly 18 is illustrated in FIGS. 18 to 20, it will be appreciated that the first or second housing part 14, 16 may be configured to rotate more, less, or not at all with respect to the other of the first or second housing part 14, 16.

Figure 21:
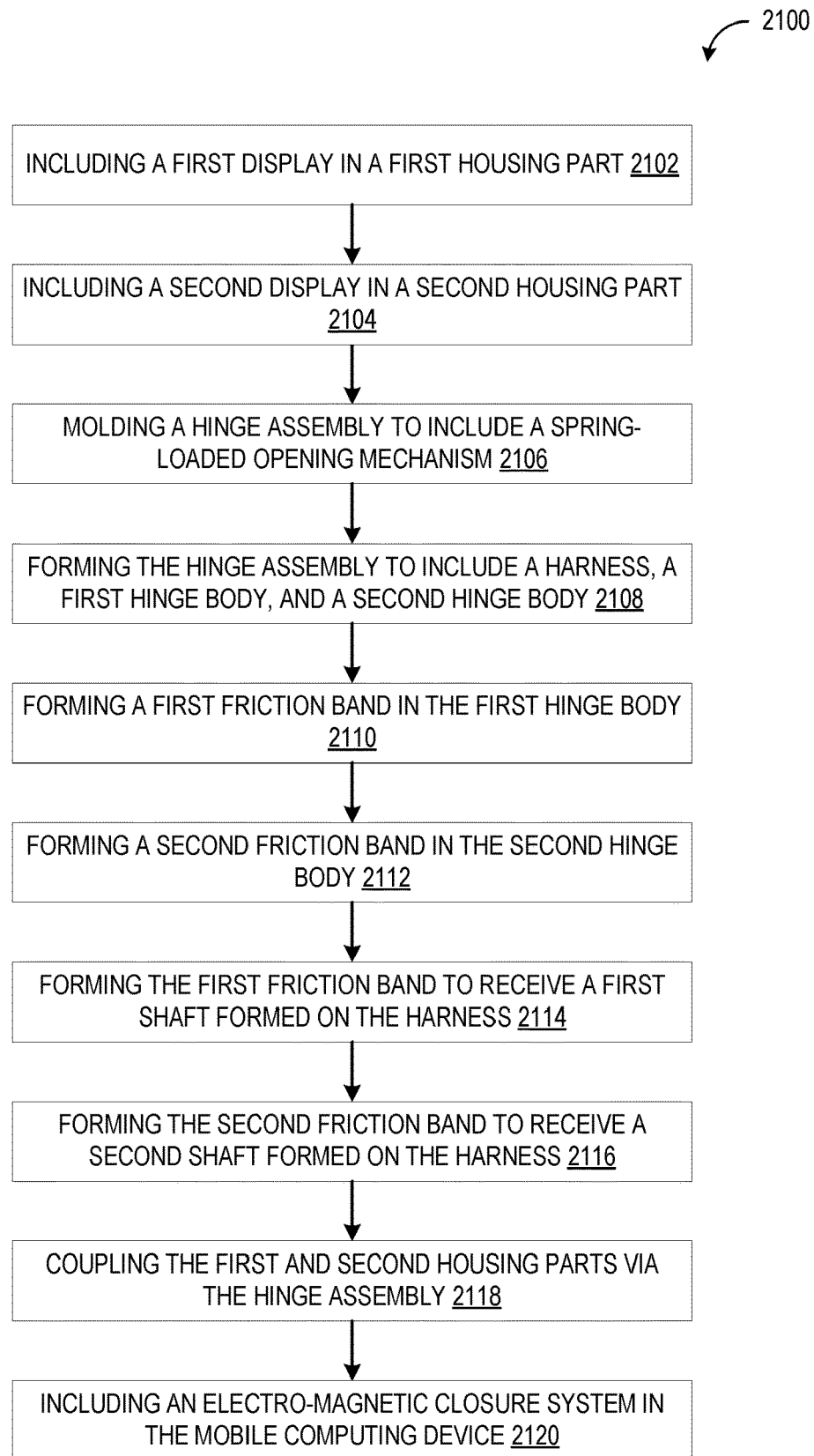
FIG. 21 shows a flowchart of a method for manufacturing a mobile computing device according one example configuration of the present disclosure.

FIG. 21 shows a flowchart of a method 2100 for manufacturing a mobile computing device according one example configuration of the present disclosure. Method 2100 is preferably implemented on a hinged mobile computing device, such as a smart phone device. However, it will be appreciated that the method 2100 may be implemented on any other computing device that is equipped with at least one hinge.

At step 2102, the method 2100 may comprise including a first display in a first housing part. Similarly, at step 2104, the method 2100 may comprise including a second display in a second housing part.

Continuing from step 2104 to step 2106, the method 2100 may include molding a hinge assembly to include a spring-loaded opening mechanism. When the first and second housing parts are coupled via the hinge assembly, the spring-loaded opening mechanism may be configured to bias with a biasing torque the first housing part and second housing part to rotate away from each other when the first and second displays are in the closed face-to-face orientation.

Proceeding from step 2106 to step 2108, the method 2100 may include forming the hinge assembly to include a harness, an integrally molded first hinge body arranged in the first housing part, and an integrally molded second hinge body arranged in the second housing part. The harness may be formed with recesses to accommodate flexible printed circuitry and cable, which may be configured as a radio frequency (RF) coaxial cable.

Advancing from step 2108 to step 2110, the method 2100 may include forming a first friction band in the first hinge body, the first friction band comprising a first gear formed around a first void. Similarly, at step 2112, the method 2100 may include forming a second friction band in the second hinge body, the second friction band comprising a second gear formed around a second void. The first and second gears may be configured to engage respective first and second cogs housed within a harness cover to control a rotation of the first and second hinge bodies.

Continuing from step 2112 to step 2114, the method 2100 may include forming the first friction band to receive a first shaft formed on the harness. Similarly, at step 2116, the method 2100 may include forming the second friction band to receive a second shaft formed on the harness. The first and second shafts may be configured to engage with the respective first and second friction bands, and the first and second hinge bodies may rotate around the respective first and second shafts.

Proceeding from step 2116 to step 2118, the method 2100 may include coupling the first and second housing parts via the hinge assembly. This step permits the first and second housing parts to rotate between angular orientations from a closed face-to-face angular orientation to a back-to-back angular orientation. As discussed above, the first and second displays may rotate around the hinge in a range up to 360 degrees, thereby enabling the mobile computing device to be arranged in a configuration that best suits the needs of the user for a desired function or environmental constraint. The engagement of the first and second gears with the respective first and second cogs, as described above, may coordinate a timing of the rotation of the first and second housing parts between face-to-face and back-to-back orientations. Further, coupling the first and second housing parts with the hinge assembly may permit the flexible printed circuitry and the RF coaxial cable to extend from the first housing part to the second housing part via the hinge assembly.

Advancing from step 2118 to step 2120, the method 2100 may include including an electro-magnetic closure system in the mobile computing device. The electro-magnetic closure system may be configured to retain the first and second displays in the closed back-to-back orientation. A release actuator may be included in the electro-magnetic closure system, and actuation of the release actuator when the first and second displays are in the closed face-to-face orientation may permit the first housing part to rotationally separate from the second housing part to a predetermined angular orientation due to the biasing torque of the spring-loaded opening mechanism.

In some embodiments, the methods and processes described herein may be tied to a computing system of one or more computing devices. In particular, such methods and processes may be implemented as a computer-application program or service, an application-programming interface (API), a library, and/or other computer-program product.

Figure 22:
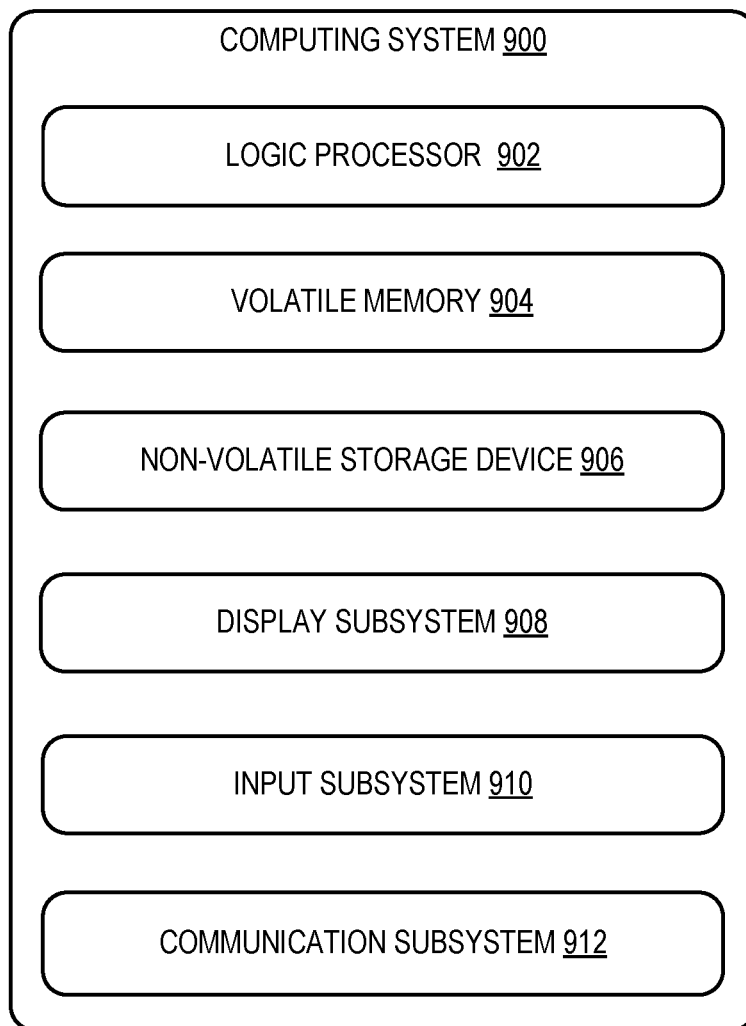
FIG. 22 shows an example computing system according to one implementation of the present disclosure.

FIG. 22 schematically shows a non-limiting embodiment of a computing system 900 that can enact one or more of the methods and processes described above. Computing system 900 is shown in simplified form. Computing system 900 may embody the computing device 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 22.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a mobile computing device. The mobile computing device may comprise a first housing part including a first display, a second housing part including a second display, a hinge assembly, a spring-loaded opening mechanism, and a magnetic closure system. The hinge assembly may be configured to couple the first and second housing parts and permit rotation of the first and second displays from a closed face-to-face orientation to a back-to-back orientation. The spring-loaded opening mechanism may be arranged in the hinge assembly and configured to bias with a biasing torque the first housing part and second housing part to rotate away from each other when the first and second displays are in the closed face-to-face orientation. The magnetic closure system may be configured to retain the first and second displays in the closed face-to-face orientation against the biasing torque of the spring-loaded opening mechanism. The magnetic closure system may include a release actuator, and actuation of the release actuator when the first and second displays are in the closed face-to-face orientation may permit the first housing part to rotationally separate from the second housing part to a predetermined angular orientation due to the biasing torque of the spring-loaded opening mechanism.

In this aspect, additionally or alternatively, the hinge assembly may include a first hinge body arranged in the first housing part and a second hinge body arranged in the second housing part, and the first and second hinge bodies may be coupled via a harness. A first shaft of the harness may reside in the first housing part, and a second shaft of the harness may reside in the second housing part. The spring-loaded opening mechanism may include a first spring arranged on a first pin and positioned in the first hinge body and a second spring arranged on a second pin and positioned in the second hinge body.

In this aspect, additionally or alternatively, the spring-loaded opening mechanism may include a first follower and a second follower. A first end of the first follower may be disposed in a recess formed in a first head of the first pin, and a second end of the first follower may be engaged with a first cam formed on the first shaft of the harness. A first end of the second follower may be disposed in recess formed in a second head of the second pin, and a second end of the second follower may be engaged with a second cam formed on the second shaft of the harness. When potential energy stored in the first and second springs is released, the second ends of the first and second followers may rotate around the respective first and second cams, thereby rotating the first and second hinge bodies to rotationally separate the first housing part from the second housing part to the predetermined angular orientation.

In this aspect, additionally or alternatively, the first and second followers may be formed such that a first end of each follower is orthogonal with respect to a second end of the respective follower. In this aspect, additionally or alternatively, a void formed in each hinge body may be shaped to accommodate a respective follower and secure engagement of the follower with a respective cam when the hinge assembly is in an assembled state. In this aspect, additionally or alternatively, the magnetic closure system may include a first magnet arranged in the first housing part and a second magnet arranged in the second housing part, and the first and second housing parts may be held in the closed face-to-face orientation via a magnetic force between the first and second magnets.

In this aspect, additionally or alternatively, the magnetic closure system may be an electro-magnetic closure system that includes an electric motor, and engagement of the release actuator on one of the first and second housing parts may actuate the electric motor to move the first magnet. Movement of the first magnet may reduce the magnetic force between the first and second magnets, and the reduction in the magnetic force may permit the first housing part to rotationally separate from the second housing part to the predetermined angular orientation. In this aspect, additionally or alternatively, the first and second housing parts may be opened at an angle in a range of 10 degrees to 45 degrees in the predetermined angular orientation.

In this aspect, additionally or alternatively, the first hinge body may include a first friction band comprising a first gear formed around a first void, and the second hinge body may include a second friction band comprising a second gear formed around a second void. The first friction band may be configured to receive the first shaft formed on the harness, and the second friction band may be configured to receive the second shaft formed on the harness. In this aspect, additionally or alternatively, engagement of the first and second shafts with the respective first and second friction bands may permit rotation of the first and second hinge bodies around respective first and second shafts. The first and second gears may be configured to engage respective first and second cogs housed within a harness cover to control rotation of the first and second hinge bodies and coordinate a timing of the rotation of the first and second housing parts between the face-to-face and back-to-back orientations.

Another aspect provides a method for manufacturing a mobile computing device. The method may comprise including a first display in a first housing part and including a second display in a second housing part. The method may further include molding a hinge assembly to include a spring-loaded opening mechanism. The method may further include coupling the first and second housing parts via the hinge assembly. The hinge assembly may be configured to permit rotation of the first and second displays from a closed face-to-face orientation to a back-to-back orientation, and to bias with a biasing torque the first housing part and second housing part to rotate away from each other when the first and second displays are in the closed face-to-face orientation. The method may further include including an electro-magnetic closure system in the mobile computing device, and the electro-magnetic closure system may be configured to retain the first and second displays in the closed face-to-face orientation. The method may further include including a release actuator in the electro-magnetic closure system, and actuation of the release actuator when the first and second displays are in the closed face-to-face orientation may permit the first housing part to rotationally separate from the second housing part to a predetermined angular orientation due to the biasing torque of the spring-loaded opening mechanism.

In this aspect, additionally or alternatively, the method may further comprise forming the hinge assembly to include a first hinge body arranged in the first housing part and a second hinge body arranged in the second housing part. The method may further include coupling the first and second hinge bodies via a harness and molding the harness to include a first shaft arranged in the first housing part and a second shaft arranged in the second housing part. The method may further include including in the spring-loaded opening mechanism a first spring arranged on a first pin and positioned in the first hinge body and a second spring arranged on a second pin and positioned in the second hinge body.

In this aspect, additionally or alternatively, the method may further comprise forming the spring-loaded opening mechanism to include a first follower and a second follower. The method may further include shaping the first follower to include a first end and a second end. The first end may be configured to be disposed in a recess formed in a first head formed on the first pin, and the second end may be configured to engage with a first cam formed on the first shaft of the harness. The method may further include shaping the second follower to include a first end and a second end. The first end may be configured to be disposed in a recess formed in a second head formed on the second pin, and the second end may be configured to engage with a second cam formed on the second shaft of the harness. When potential energy stored in the first and second springs is released, the second ends of the first and second followers may rotate around the respective first and second cams, thereby rotating the first and second hinge bodies to rotationally separate the first housing part from the second housing part to the predetermined angular orientation.

In this aspect, additionally or alternatively, the method may further comprise shaping the first and second followers such that a first end of each follower is orthogonal with respect to a second end of the respective follower. In this aspect, additionally or alternatively, the method may further comprise molding each hinge body to include a recess shaped to accommodate a respective follower and secure engagement of the follower with a respective cam when the hinge assembly is in an assembled state.

In this aspect, additionally or alternatively, the method may further comprise including in the electro-magnetic closure system a first magnet arranged in the first housing part, a second magnet arranged in the second housing part, and an electric motor. The first and second housing parts may be held in the closed face-to-face orientation via a magnetic force between the first and second magnets. In this aspect, additionally or alternatively, the method may further comprise positioning the release actuator on one of the first and second housing parts, the engagement of which actuates the electric motor to move the first magnet. Movement of the first magnet may reduce the magnetic force between the first and second magnets, and the reduction in the magnetic force may permit the first housing part to rotationally separate from the second housing part to the predetermined angular orientation. In this aspect, additionally or alternatively, the method may further comprise configuring the first and second housing parts to open at an angle in a range of 10 degrees to 45 degrees in the predetermined angular orientation upon actuation of the release actuator.

In this aspect, additionally or alternatively, the method may further comprise molding the first hinge body to have a first friction band comprising a first gear formed around a first void and molding the second hinge body to have a second friction band comprising a second gear formed around a second void. The first friction band may be configured to receive the first shaft formed on the harness, and the second friction band may be configured to receive the second shaft formed on the harness. Engagement of the first and second shafts with the respective first and second friction bands may permit rotation of the first and second hinge bodies around respective first and second shafts. The first and second gears may be configured to engage respective first and second cogs housed within a harness cover to control rotation of the first and second hinge bodies and coordinate a timing of the rotation of the first and second housing parts between the closed face-to-face and back-to-back orientations.

Another aspect provides a method of operation of a hinged mobile computing device. The method may comprise receiving a user input at a release actuator of an electro-magnetic closure system of the hinged mobile computing device when the electro-magnetic closure system is in a closed configuration retaining a first display and a second display in a closed face-to-face orientation against a biasing torque of a spring-loaded opening mechanism arranged in a hinge assembly of the hinged mobile computing device. The method may further include, in response, actuating the electro-magnetic closure system to transition from the closed configuration to a released configuration that permits the first housing part to rotationally separate from the second housing part to a predetermined angular orientation due to the biasing torque of the spring-loaded opening mechanism.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device comprising:
a first housing part including a first display;
a second housing part including a second display;
a hinge assembly configured to couple the first and second housing parts and permit rotation of the first and second displays from a closed face-to-face orientation to a back-to-back orientation;
a spring-loaded opening mechanism arranged in the hinge assembly and configured to bias with a biasing torque the first housing part and second housing part to rotate away from each other when the first and second displays are in the closed face-to-face orientation; and
a magnetic closure system configured to retain the first and second displays in the closed face-to-face orientation against the biasing torque of the spring-loaded opening mechanism, and including a release actuator, wherein actuation of the release actuator when the first and second displays are in the closed face-to-face orientation permits the first housing part to rotationally separate from the second housing part to a predetermined angular orientation due to the biasing torque of the spring-loaded opening mechanism.

2. The mobile computing device of claim 1, wherein
the hinge assembly includes a first hinge body arranged in the first housing part and a second hinge body arranged in the second housing part, the first and second hinge bodies being coupled via a harness,
a first shaft of the harness resides in the first housing part,
a second shaft of the harness resides in the second housing part, and
the spring-loaded opening mechanism includes a first spring arranged on a first pin and positioned in the first hinge body and a second spring arranged on a second pin and positioned in the second hinge body.

3. The mobile computing device of claim 2, wherein
the spring-loaded opening mechanism includes a first follower and a second follower,
a first end of the first follower is disposed in a recess formed in a first head of the first pin, and a second end of the first follower is engaged with a first cam formed on the first shaft of the harness,
a first end of the second follower is disposed in recess formed in a second head of the second pin, and a second end of the second follower is engaged with a second cam formed on the second shaft of the harness, and
when potential energy stored in the first and second springs is released, the second ends of the first and second followers rotate around the respective first and second cams, thereby rotating the first and second hinge bodies to rotationally separate the first housing part from the second housing part to the predetermined angular orientation.

4. The mobile computing device of claim 3, wherein the first and second followers are formed such that a first end of each follower is orthogonal with respect to a second end of the respective follower.

5. The mobile computing device of claim 3, wherein a void formed in each hinge body is shaped to accommodate a respective follower and secure engagement of the follower with a respective cam when the hinge assembly is in an assembled state.

6. The mobile computing device of claim 1, wherein the magnetic closure system includes a first magnet arranged in the first housing part and a second magnet arranged in the second housing part, and the first and second housing parts are held in the closed face-to-face orientation via a magnetic force between the first and second magnets.

7. The mobile computing device of claim 6, wherein the magnetic closure system is an electro-magnetic closure system that includes an electric motor, engagement of the release actuator on one of the first and second housing parts actuates the electric motor to move the first magnet, movement of the first magnet reduces the magnetic force between the first and second magnets, and the reduction in the magnetic force permits the first housing part to rotationally separate from the second housing part to the predetermined angular orientation.

8. The mobile computing device of claim 1, wherein the first and second housing parts are open at an angle in a range of 10 degrees to 45 degrees in the predetermined angular orientation.

9. The mobile computing device of claim 2, wherein the first hinge body includes a first friction band comprising a first gear formed around a first void, the first friction band being configured to receive the first shaft formed on the harness, and the second hinge body includes a second friction band comprising a second gear formed around a second void, the second friction band being configured to receive the second shaft formed on the harness.

10. The mobile computing device of claim 9, wherein engagement of the first and second shafts with the respective first and second friction bands permits rotation of the first and second hinge bodies around respective first and second shafts, and the first and second gears are configured to engage respective first and second cogs housed within a harness cover to control rotation of the first and second hinge bodies and coordinate a timing of the rotation of the first and second housing parts between the face-to-face and back-to-back orientations.

11. A method for manufacturing a mobile computing device, the method comprising:
including a first display in a first housing part;
including a second display in a second housing part;
molding a hinge assembly to include a spring-loaded opening mechanism;
coupling the first and second housing parts via the hinge assembly, the hinge assembly being configured to permit rotation of the first and second displays from a closed face-to-face orientation to a back-to-back orientation, and to bias with a biasing torque the first housing part and second housing part to rotate away from each other when the first and second displays are in the closed face-to-face orientation;
including an electro-magnetic closure system in the mobile computing device, the electro-magnetic closure system being configured to retain the first and second displays in the closed face-to-face orientation; and
including a release actuator in the electro-magnetic closure system, wherein
actuation of the release actuator when the first and second displays are in the closed face-to-face orientation permits the first housing part to rotationally separate from the second housing part to a predetermined angular orientation due to the biasing torque of the spring-loaded opening mechanism.

12. The method of claim 11, further comprising:
forming the hinge assembly to include a first hinge body arranged in the first housing part and a second hinge body arranged in the second housing part;
coupling the first and second hinge bodies via a harness;
molding the harness to include a first shaft arranged in the first housing part and a second shaft arranged in the second housing part; and
including in the spring-loaded opening mechanism a first spring arranged on a first pin and positioned in the first hinge body and a second spring arranged on a second pin and positioned in the second hinge body.

13. The method of claim 12, further comprising:
forming the spring-loaded opening mechanism to include a first follower and a second follower;
shaping the first follower to include a first end configured to be disposed in a recess formed in a first head formed on the first pin, and a second end configured to engage with a first cam formed on the first shaft of the harness; and
shaping the second follower to include a first end configured to be disposed in a recess formed in a second head formed on the second pin, and a second end configured to engage with a second cam formed on the second shaft of the harness, wherein
when potential energy stored in the first and second springs is released, the second ends of the first and second followers rotate around the respective first and second cams, thereby rotating the first and second hinge bodies to rotationally separate the first housing part from the second housing part to the predetermined angular orientation.

14. The method of claim 13, further comprising:
shaping the first and second followers such that a first end of each follower is orthogonal with respect to a second end of the respective follower.

15. The method of claim 13, the method further comprising:
molding each hinge body to include a recess shaped to accommodate a respective follower and secure engagement of the follower with a respective cam when the hinge assembly is in an assembled state.

16. The method of claim 11, further comprising:
including in the electro-magnetic closure system a first magnet arranged in the first housing part, a second magnet arranged in the second housing part, and an electric motor, wherein
the first and second housing parts are held in the closed face-to-face orientation via a magnetic force between the first and second magnets.

17. The method of claim 16, further comprising:
positioning the release actuator on one of the first and second housing parts, the engagement of which actuates the electric motor to move the first magnet, wherein
movement of the first magnet reduces the magnetic force between the first and second magnets, and
the reduction in the magnetic force permits the first housing part to rotationally separate from the second housing part to the predetermined angular orientation.

18. The method of claim 11, further comprising:
configuring the first and second housing parts to open at an angle in a range of 10 degrees to 45 degrees in the predetermined angular orientation upon actuation of the release actuator.

19. The method of claim 12, further comprising:
molding the first hinge body to have a first friction band comprising a first gear formed around a first void, the first friction band being configured to receive the first shaft formed on the harness; and
molding the second hinge body to have a second friction band comprising a second gear formed around a second void, the second friction band being configured to receive the second shaft formed on the harness, wherein engagement of the first and second shafts with the respective first and second friction bands permits rotation of the first and second hinge bodies around respective first and second shafts, and
the first and second gears are configured to engage respective first and second cogs housed within a harness cover to control rotation of the first and second hinge bodies and coordinate a timing of the rotation of the first and second housing parts between the closed face-to-face and back-to-back orientations.

20. A method of operation of a hinged mobile computing device, the method comprising:
receiving a user input at a release actuator of an electro-magnetic closure system of the hinged mobile computing device when the electro-magnetic closure system is in a closed configuration retaining a first display and a second display in a closed face-to-face orientation against a biasing torque of a spring-loaded opening mechanism arranged in a hinge assembly of the hinged mobile computing device; and
in response, actuating the electro-magnetic closure system to transition from the closed configuration to a released configuration that permits the first housing part to rotationally separate from the second housing part to a predetermined angular orientation due to the biasing torque of the spring-loaded opening mechanism.

* * * * *